United States Patent
Sunell et al.

(10) Patent No.: US 12,382,544 B2
(45) Date of Patent: Aug. 5, 2025

(54) ACTIVATION/DE-ACTIVATION MECHANISM FOR ONE SCG AND SCELLS, AND CONDITIONAL PSCELL CHANGE/ADDITION

(71) Applicant: InterDigital Patent Holdings, Inc., Wilmington, DE (US)

(72) Inventors: Kai-Erik Sunell, Naantali (FI); Pascal Adjakple, Great Neck, NY (US); Jerome Vogedes, Milwaukee, WI (US); Rocco Di Girolamo, Laval (CA); Kyle Pan, Saint James, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/779,947

(22) Filed: Jul. 22, 2024

(65) Prior Publication Data

US 2024/0381486 A1    Nov. 14, 2024

Related U.S. Application Data

(63) Continuation of application No. 18/552,981, filed as application No. PCT/US2022/022816 on Mar. 31, 2022.

(Continued)

(51) Int. Cl.
*H04W 76/34* (2018.01)
*H04W 24/08* (2009.01)

(52) U.S. Cl.
CPC ........... *H04W 76/34* (2018.02); *H04W 24/08* (2013.01)

(58) Field of Classification Search
CPC ................ H04W 76/34; H04W 24/08
See application file for complete search history.

(56) References Cited

U.S. PATENT DOCUMENTS 11,546,968 B2    1/2023   Zhang et al.
2017/0127473 A1    5/2017   Virtej et al.
(Continued)

FOREIGN PATENT DOCUMENTS

EP        3944670 A1       1/2022
IN     202041046102    * 10/2020
(Continued)

OTHER PUBLICATIONS

3rd Generation Partnership Project; Technical Specification Group Radio Access Network; Evolved Universal Terrestrial Radio Access (E-UTRA) and NR; Multi-connectivity; Stage 2 (Release 16); 3GPP TS 37.340 V16.4.0; Dec. 2020, pp. 1-84.

(Continued)

*Primary Examiner* — Sujoy K Kundu
*Assistant Examiner* — Raul Rivas
(74) *Attorney, Agent, or Firm* — Flaster Greenberg P.C.

(57) ABSTRACT

Methods, apparatus, and systems are described for assistance information from the UE to network side, e.g., enabling faster decision-making for secondary cell group deactivation in 3GPP MR DC/CA deployments. According to some aspects, instructions for UE behavior upon MR DC/CA secondary cell group activation are provided in a secondary cell group deactivation message to reduce delays for a UE triggered secondary group activation. RRC signaling ambiguities for conditional PSCell addition/change may be resolved by a synchronization message between a main node and a secondary node to avoid delays and signaling errors.

20 Claims, 11 Drawing Sheets

Related U.S. Application Data

(60) Provisional application No. 63/185,890, filed on May 7, 2021, provisional application No. 63/168,707, filed on Mar. 31, 2021.

(56) References Cited

U.S. PATENT DOCUMENTS

| | | | |
|---|---|---|---|
| 2020/0267631 A1* | 8/2020 | Yilmaz | H04W 48/20 |
| 2021/0051767 A1* | 2/2021 | Zhang | H04W 76/34 |
| 2021/0352750 A1 | 11/2021 | Cheng et al. | |
| 2022/0117022 A1* | 4/2022 | Cheng | H04W 76/19 |
| 2022/0132625 A1 | 4/2022 | Mattam et al. | |
| 2023/0128847 A1 | 4/2023 | Purkayastha et al. | |
| 2023/0276353 A1 | 8/2023 | Cheng et al. | |
| 2023/0397297 A1 | 12/2023 | Zhang et al. | |

FOREIGN PATENT DOCUMENTS

| | | | |
|---|---|---|---|
| WO | WO 2016/021821 A1 | 2/2016 | |
| WO | WO 2020/113999 A1 | 6/2020 | |
| WO | WO 2020/221110 A1 | 11/2020 | |
| WO | WO-2022086283 A1 * | 4/2022 | H04W 76/15 |

OTHER PUBLICATIONS

3rd Generation Partnership Project; Technical Specification Group Radio Access Network; NR; NR and NG-RAN Overall Description; Stage 2 (Release 16); 3GPP TS 38.300 V16.4.0; Jan. 2021, pp. 1-149.

3rd Generation Partnership Project; Technical Specification Group Radio Access Network; NR; Radio Resource Control (RRC) protocol specification; (Release 16); 3GPP TS 38.331 V16.3.1; Jan. 2021, pp. 1-932.

\* cited by examiner

ACTIVATION/DE-ACTIVATION MECHANISM FOR ONE SCG AND SCELLS, AND CONDITIONAL PSCELL CHANGE/ADDITION

CROSS-REFERENCE TO RELATED APPLICATIONS

This application is a Continuation of U.S. patent application Ser. No. 18/552,981, filed Sep. 28, 2023, which is the National Stage Application of International Patent Application No. PCT/US2022/022816, filed Mar. 31, 2022, which claims the benefit of U.S. Provisional Application No. 63/168,707, filed Mar. 31, 2021, entitled "Activation/De-Activation Mechanism for One SCG And SCELLS, and Conditional PSCELL Change/Addition," and U.S. Provisional Application No. 63/185,890, filed May 7, 2021, entitled "Activation/De-Activation Mechanism for One SCG And SCELLS, and Conditional PSCELL Change/Addition," the contents of which are hereby incorporated by reference in their entirety.

BACKGROUND

One important design objective for 3GPP radio interface technologies is to provide solutions for high data rate transfer to meet the requirements of mobile broadband services.

Carrier Aggregation (CA) is a widely-deployed 3GPP radio interface feature for mobile radio broadband services (e.g., as introduced in UTRA (Rel-8) and EUTRA (Rel-10)). CA splits data on Medium Access Control (MAC) layer among multiple Hybrid Automatic Repeat reQuest (HARQ) entities. A principle of CA is to use one common scheduler in one physical (and logical) node to aggregate data over multiple HARQ entities to increase user experienced data throughput.

Dual Connectivity (DC) is introduced in EUTRA for Rel-12 small cell enhancements to split data on Packet Data Convergence Protocol (PDCP) layer. DC allows transmission and reception from multiple physical (and logical) nodes. DC generally provides similar kind of benefits as CA, but DC also allows aggregation of data from multiple schedulers and nodes. The nodes are termed as Main Node (MN) and Secondary Node (SN), where the MN is the main controlling entity and SN is used for aggregation purposes to increase user throughput. CA and DC do not exclude each other because the data split is done on different levels and they are often both used in same network deployments.

NR radio technology supports both CA and DC. In contrast to UTRA and EUTRA, NR has separate Radio Resource Control (RRC) protocol termination points in both MN and SN. It allows SN to change, release and modify aggregation cells without coordination from MN. It also allows split radio bearers for signaling which significantly improves mobility robustness, e.g., reduces risk of dropped and failed connections during handovers.

Another important difference in NR DC compared to earlier 3GPP technologies is that NR supports two different radio access technologies within the same DC framework. For example, EUTRA and NR radio technologies are supported. 3GPP denotes the support of multiple radio technologies as a Multi-Radio (MR) feature.

The cells that belong to the same node are referred to as Cell Groups (CGs) and CGs that belong to MN and SN are referred to MCG and SCG respectively. Each CG has a primary cell that has control of the CG. The primary cell of SCG is called PSCell. The architecture of MR DC/CA includes eNBs and en-gNB connected to an Evolved Packet Core (EPC). This kind of EUTRA-NR (EN) scenario is denoted as EN-DC in 3GPP.

In EN-DC, UE and network power consumption may be an issue, due to maintaining two radio links simultaneously. When the UE data rate requirement changes dynamically (e.g., from high to low), SN may be worth considering to be (de) activated to save network and UE energy consumption.

Configuring an activation/de-activation mechanism for one SCG and SCells and/or conditional PSCell change/addition in 5G networks may encompass a wide variety of scenarios, servers, gateways, and devices, such as those described in, for example: 3GPP TS 38.300, NR; NR and NG-RAN Overall Description; Stage 2 (Release 16), V16.4.0; 3GPP TS 38.331, Radio Resource Control (RRC) protocol specification (Release 16), V16.3.1; and 3GPP TS 37.340, NR; Multi-connectivity; Overall description; Stage-2 (Release 16), V16.4.0.

SUMMARY

Described herein are methods, apparatus, and systems for an activation/de-activation mechanism for one SCG and SCells and/or conditional PSCell change/addition.

According to some aspects, a method is provided to estimate dynamic changes of data rate requirements in the user equipment.

According to some aspects, a method is provided to spontaneously provide deactivation and activation related assistance information to a network node.

According to some aspects, a method is provided to request deactivation and activation related assistance information from a network node.

According to some aspects, a method is provided to respond to request of deactivation and activation related assistance information.

According to some aspects, a method is provided to route deactivation and activation related assistance information from one network node to another According to some aspects, a method in a network node is provided to obtain deactivation and activation decisions based on combined data rate estimates and deactivation related assistance information from the user equipment. In one aspect, the assistance information provides information about application performance, bandwidth consumption per application, energy consumption and quality of service related attributes such as latency, priorities and pre-emption.

According to some aspects, a method is provided to provide instructions about user equipment behavior upon node activation.

According to some aspects, a method is provided to resolve signaling ambiguity upon addition and change of PSCell.

According to some aspects, a user equipment (UE) may receive a Radio Resource Control (RRC) message from a network node (e.g., a next generation Node B). The UE and/or the network node may be an apparatus including a processor, communications circuitry, and a memory. The memory may store instructions that, when executed by the processor, cause the apparatus to perform one or more operations.

The RRC message may include an indication of a deactivation of a secondary cell group (SCG) and a behavior of the UE upon a reactivation of the SCG. For example, the behavior of the UE upon the reactivation of the SCG may be based on a collective data rate requirement of running one or more applications in an operating system of the UE. Moreover, the collective data rate requirement may be based at least in part on a dynamic change of one or more of data rate, latency, or one or more other attributes of quality of service. The collective data requirements may also be based on one or more of, a termination of an application, a termination of a traffic, a termination of a service, a termination of a task, a change of mode of operation, a launch of an application, a launch of a traffic, a launch of service, or a launch of a task.

The UE may store information comprising the behavior of the UE upon the reactivation of the SCG. One or more further UE behavior instructions may be received by the UE from the network node. For example the one or more further UE behavior instructions may be included in a Radio Resource Control (RRC) reconfiguration message. According to some aspects, the RRC may include one or more configurations for radio measurements to be performed by the UE when the SCG is deactivated. For example, the one or more radio measurement configurations may include an indication to reduce measurements to be performed.

The UE may replace the behavior of the UE upon the reactivation of the SCG in the stored information with the one or more further UE instructions. According to some aspects, the UE may determine an evaluation measure. The evaluation measure may include a significance of a dynamic change of data rate or one or more quality of service attributes. For example, the UE may determine a threshold value for the evaluation measure and the significance of the dynamic change may be determined based on a comparison of the evaluation measure with the determined threshold. According to some aspects, the UE may transmit the evaluation measure to the network node, e.g., the behavior of the UE upon the reactivation of the SCG may be based on the evaluation measure.

According to some aspects, the network node may determine an indication of a deactivation of an SCG. The network node may determine a behavior of the UE upon a reactivation of the SCG. Moreover, the network node may determine an RRC message and may transmit the RRC to the UE. The RRC message may include the indication of the deactivation of the SCG and the behavior of the UE upon the reactivation of the SCG.

According to some aspects, the network node may determine one or more further UE behavior instructions. The network node may determine an RRC reconfiguration message including, for example, the one or more further UE behavior instructions. As an example, the RRC reconfiguration message may include one or more radio measurement configurations to be performed by the UE when the SCG is deactivated.

According to some aspects, the network node may transmit the RRC reconfiguration message to the UE. For example, the RRC reconfiguration message may include one or more configurations for radio measurement to be performed by the UE when the SCG is deactivated.

This Summary is provided to introduce a selection of concepts in a simplified form that are further described below in the Detailed Description. This Summary may not be intended to identify key features or essential features of the claimed subject matter, nor is it intended to be used to limit the scope of the claimed subject matter. Furthermore, the claimed subject matter may not be limited to features that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

Figure 1:
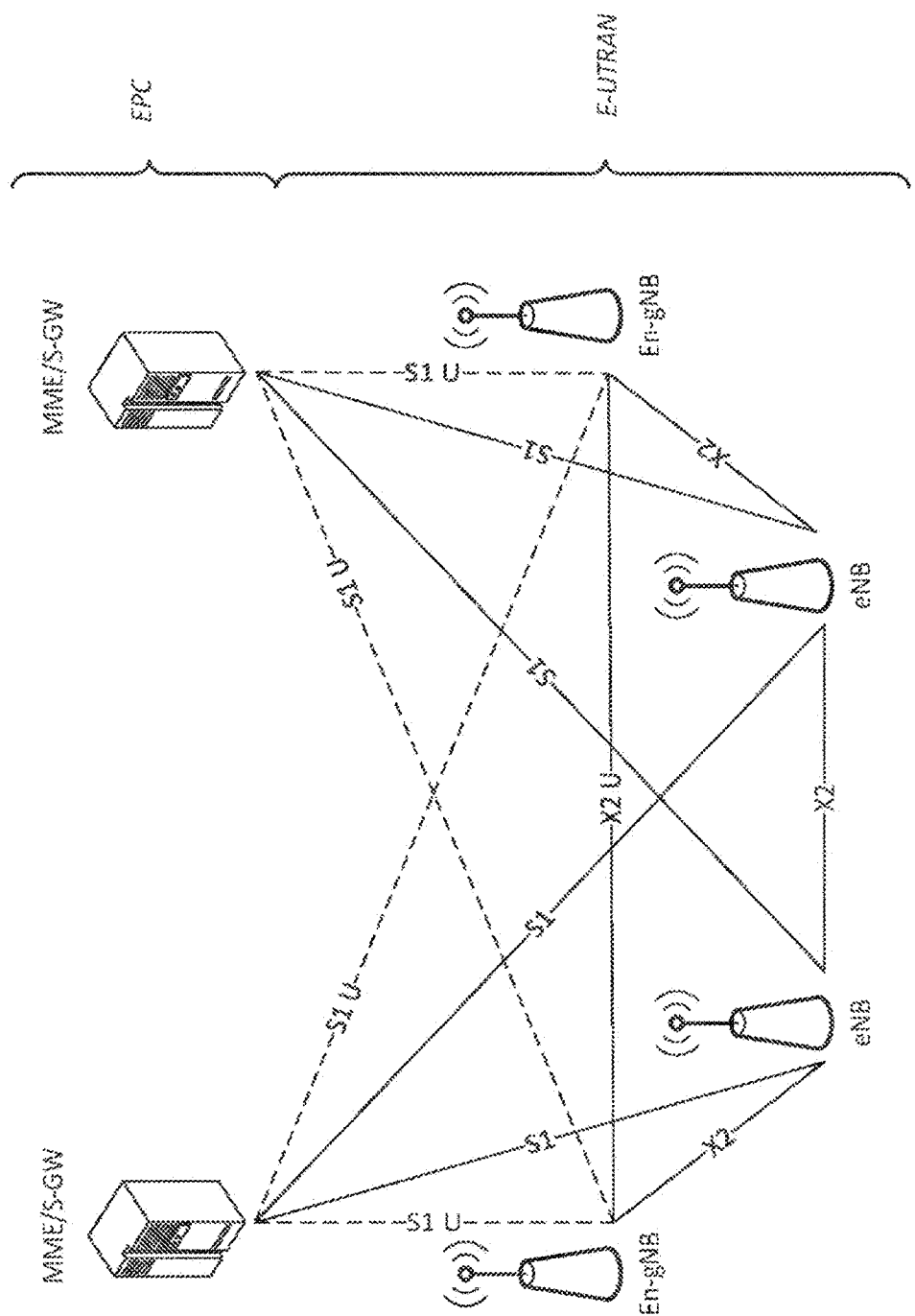
FIG. 1 shows an example of an MR DC/CA architecture.

Table 0.1 describes some of the abbreviations used herein.

TABLE 0.1

| Abbreviations | |
| --- | --- |
| 5GC | 5G Core |
| API | Application Programming Interface |
| ARQ | Automatic Repeat request |
| CA | Carrier Aggregation |
| CG | Cell Group |
| CN | Core Network |
| DC | Dual Connectivity |
| DL | Downlink |
| eNB | EUTRA NodeB |
| en-gNB | gNB connected to EPC |
| gNB | NR NodeB |
| EN | EUTRA-NR (multi-radio connectivity scenario) |
| EPC | Evolved Packet Core |
| gNB | NR NodeB |
| HARQ | Hybrid ARQ |
| IE | Information Element |
| MAC | Medium Access Control |
| MCG | Main Cell Group |
| MN | Main Node |
| MR | Multi-Radio |
| NAS | Non-Access Stratum |
| NG-RAN | Next Generation RAN |
| NR | New Radio |
| NW | Network |
| OS | Operating System |
| PCell | Primary Cell |
| PDCP | Packet Data Convergence Protocol |
| POSIX | Portable Operating System Interface |
| PSCell | Primary Secondary Cell |
| QoS | Quality of Service |
| RAN | Radio Access Network4 |
| RRC | Radio Resource Control |
| SCell | Secondary Cell |
| SCG | Secondary Cell Group |
| SI | System Information |
| SIB | System Information Block |
| SIM | Subscriber Identification Module |
| SN | Secondary Node |
| SSB | Synchronization Signal Block |
| S-SN | Source SN |
| T-SN | Target SN |
| UE | User Equipment |
| UL | Uplink |

According to some aspects, an important design objective for 3GPP radio interface technologies is to provide solutions for high data rate transfer to meet the requirements of mobile broadband services.

Introduced in UTRA (Rel-8) and EUTRA (Rel-10), Carrier Aggregation (CA) is a widely-deployed 3GPP radio interface feature for mobile radio broadband services. CA splits data on Medium Access Control (MAC) layer among multiple Hybrid Automatic Repeat reQuest (HARQ) entities. According to some aspects, a main principle of CA is to use one common scheduler in one physical (and logical) node to aggregate data over multiple HARQ entities to increase user experienced data throughput.

Dual Connectivity (DC) is introduced in EUTRA for Rel-12 small cell enhancements to split data on Packet Data Convergence Protocol (PDCP) layer. DC allows transmission and reception from multiple physical (and logical) nodes. It generally provides similar kind of benefits as CA but it also allows aggregation of data from multiple schedulers and nodes. The nodes are termed as Main Node (MN) and Secondary Node (SN) where the MN is the main controlling entity and SN is used for aggregation purposes to increase user throughput. CA and DC do not exclude each other because the data split is done on different levels and therefore they are often both used in same network deployments.

NR radio technology supports both CA and DC. In contrast to UTRA and EUTRA, it has separate Radio Resource Control (RRC) protocol termination points in both MN and SN. It allows SN to change, release and modify aggregation cells without coordination from MN. It also allows split radio bearers for signaling which significantly improves mobility robustness, e.g., reduces risk of dropped and failed connections during handovers.

According to some aspects, another important difference in NR DC compared to earlier 3GPP technologies is that NR supports two different radio access technologies within the same DC framework. So far, EUTRA and NR radio technologies are supported. 3GPP denotes the support of multiple radio technologies as Multi-Radio (MR) feature.

The cells that belong to the same node are referred to as Cell Groups (CG) and CGs that belong to MN and SN are referred to MCG and SCG respectively. Each CG has its primary cell that has control of the CG. The primary cell of SCG is called PSCell. The architecture of MR DC/CA is shown in FIG. 1 where eNBs and en-gNB are connected to Evolved Packet Core (EPC). This kind of EUTRA-NR (EN) scenario is denoted as EN-DC in 3GPP.

MR DC/CA Further Enhancements in 3GPP Release 17

In EN-DC, UE and network power consumption may be an issue, e.g., due to maintaining two radio links simultaneously. When the UE data rate requirement changes dynamically (e.g., from high to low), SN may be worth considering to be (de) activated to save network and UE energy consumption.

According to some aspects, the concept of activation/deactivation means that the UE's RRC context may be maintained (e.g., not release upon deactivation) in the SN. Moreover, RRC connection setup/release may be a too slow mechanism to follow traffic changes due to required random access, RRC signaling, and context setup/release from the Core Network (CN).

Figure 2:
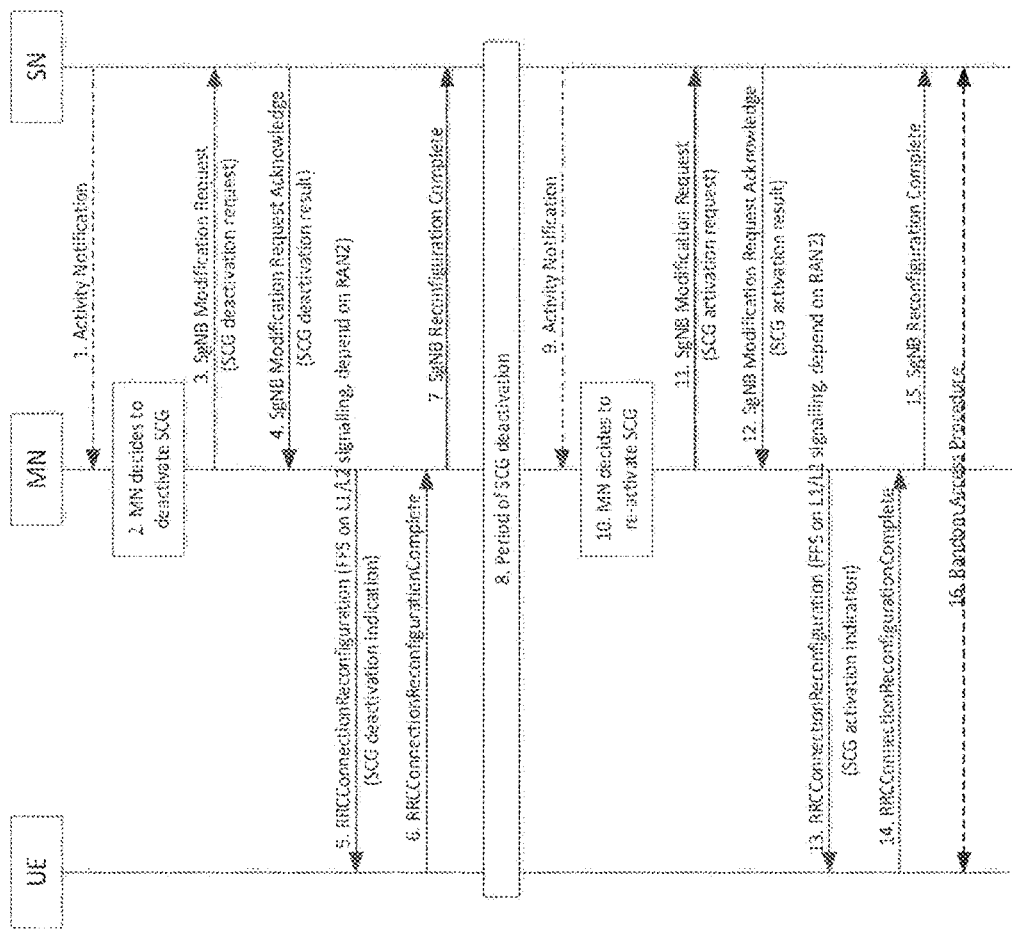
FIG. 2 shows an example of activation/de-activation of SCSG in MR DC/CA.

Network-triggered SCG activation and deactivation may be indicated to the UE via the MCG in 3GPP. Similarly, SCG activation may be requested by MN/SN/UE and SCG deactivation may be requested by MN/SN. According to some aspects, the UE may provide some assistance information for deactivation of the SCG. According to some aspects, a signaling message chart of activation and de-activation is shown in FIG. 2 where the agreements are captured.

Figure 3:
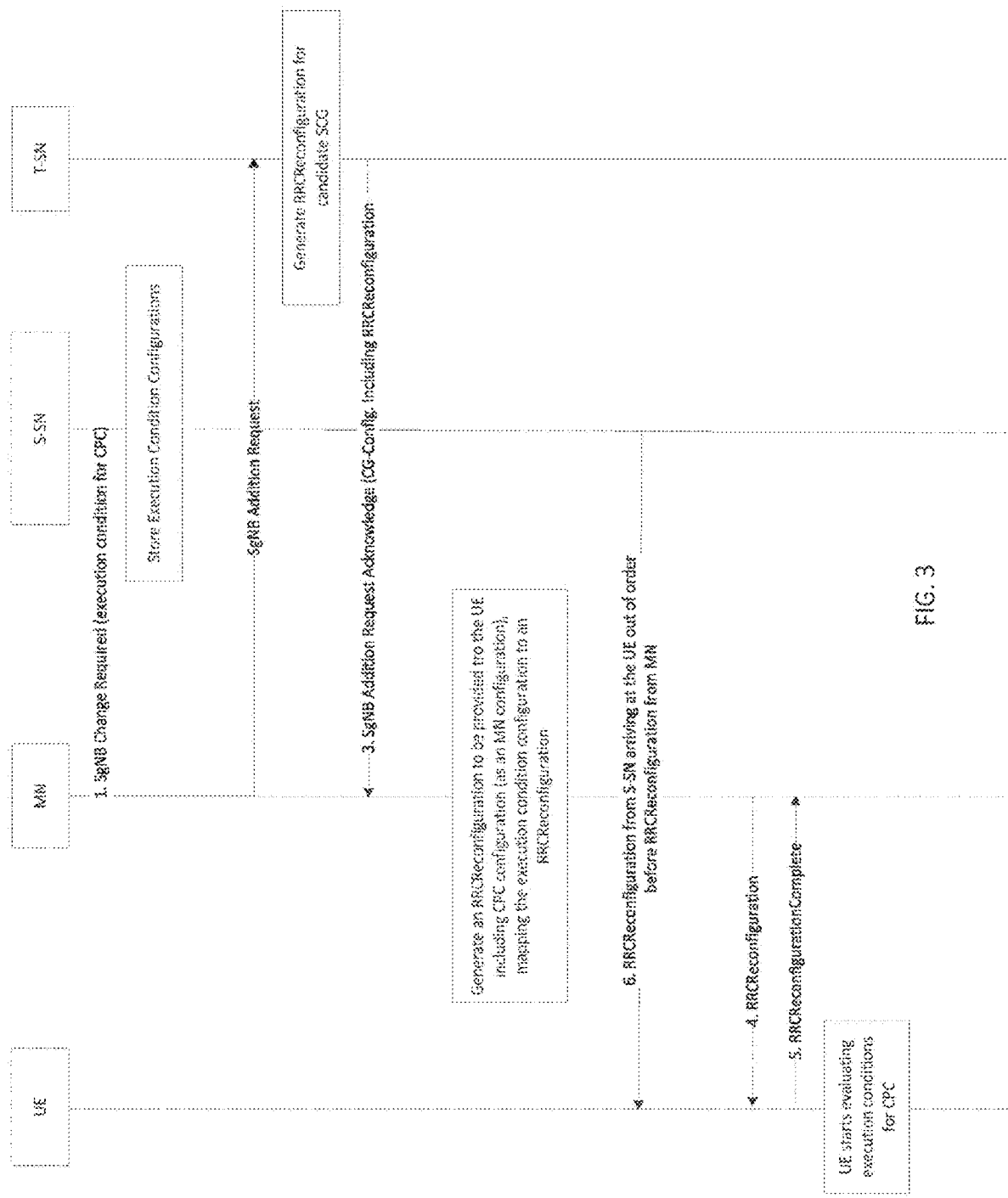
FIG. 3 shows an example of Conditional Addition and Change of PSCell (CPAC)

According to some aspects, another improvement may be Conditional PSCell Addition and Change (CPAC). CPAC may be compared conceptually to Rel-16 conditional handover, where the source cell prepares the UE for handover to a set of potential target cells. In contrast to conventional handover, the procedure may be triggered prior to any degradation in radio propagation/interference conditions which reduces the risk of handover failures. The handover configuration contains conditional execution criteria where the UE may be required to perform handover as soon as the conditional execution criteria are fulfilled which shortens handover delays. According to some aspects, a main principle of CPAC message exchange is shown in FIG. 3 where the source SN (S-SN) prepares several target SN (T-SN) for the CPAC. The agreed procedures for CPAC may be specified with the following steps:

Step 1: Based on, for example, an RRC measurement report received from the UE, source SN may decide to initiate the CPC procedure. Source SN may determine the set of target SNs for the CPC procedure. The source SN may initiate the conditional SN change procedure by sending an SgNB Change Required message (e.g., containing target SN information) and measurement results related to the target SN. According to some aspects, SgNB refers to SN in this context, e.g., with an intent to be more specific to clarify that the SN may be based on NR gNB. For each candidate target PSCell frequency, source SN may determine the CPC execution condition. In the SN Change Required message, source SN may provide information relevant to CPC configuration to the MN. In addition to the content of conventional SN Change Required message, CPC execution condition for each candidate target PSCell frequency may be included in the SN Change Required message.

Step 2: MN initiates the SN Addition procedure with the set of target SNs indicated in SN Change Required. As a baseline, the content of SN addition Request may be similar to the conventional SN Addition Request message.

Step 3: The target SN determines the target PSCell and generates RRCReconfiguration ** for the selected candidate PSCell and provides it to the MN in SN addition request acknowledgement message.

Step 4: The MN generates an RRCReconfiguration to be provided to the UE including CPC configuration (as an MN configuration), mapping the execution condition configuration to an RRCReconfiguration ** provided by the target SN for candidate PSCell.

Step 5: the UE provides an RRCReconfigurationComplete message to the MN upon reception of RRCReconfiguration message (to confirm the reception of the CPC configuration).

Problem Statements

Problem Statement #1: Basis for SCG Deactivation Decisions at the Network Side

The deactivation may be decided by the MN either solely or based on the activity indication from SN. In general, data rate monitoring and estimation of data rate changes in the network nodes are based on complex and slow procedures because this information may be based on the application layer behavior. According to some aspects, a problem statement includes whether it is possible to acquire such information from the UE to assist the decision for deactivation of SCG at the network side.

Problem Statement #2: Signaling of UE Actions Upon Activation when SCG Activation May be Indicated by the UE The UE behavior for the use case where the SCG may be activated may be indicated to the UE via the MCG. The indication includes information on whether or not the UE needs to perform a random access upon SCG activation. A problem arises, since the option for UE behavior upon the activation may be signaled after the deactivation decision. If the deactivation may be indicated by the UE to the MN, the UE needs to wait for the RRC configuration message from the MN to receive instructions for the behavior. In such a scenario, a different placement of the desired behavior upon SCG activation in another message could remove this waiting time.

Problem Statement #3: Signaling Ambiguity Upon Indication of Conditional PSCell Addition/Change Even though the concept of conditional handover can easily be applied to CPAC by copying from the conditional handover procedures, there may be still an open question because the source SN may need to update its configuration depending on the accepted candidate cells by the target SN. The source SN may have configured the measurements considering the execution condition for CPC candidate target cells. The target SN may have only accepted some cells for CPC configuration and there may be some measurement configurations (configured by the source SN) which are no longer required.

The current 3GPP technical working group agreement is that the SN can change these configurations after the RRC configuration message is received by the UE. A signaling ambiguity problem however arises, since the SN does not know the exact point of time when the RRC configuration may be received by the UE. Hence, there may be a risk that reconfiguration messages are received in a wrong order where the changed configuration from SN that was intended to be received after the original RRC reconfiguration is received before the original configuration from the SN.

Problem Statement #4: Measurements on Deactivated SCG

An important part of a UE's energy consumption may be radio measurements. For example, the UE may need to perform radio resource management measurements and monitor radio links and beams. The current NR standard requires such measurements also during deactivated SCG. There is a need to determine how measurement requirements could be relaxed for deactivated SCG to facilitate even higher energy consumption improvements in the UE.

Overview of Solutions

According to some aspects, the following solutions are provided:
- a method to estimate dynamic changes of data rate requirements in the user equipment;
- a method to spontaneously provide deactivation related assistance information to a network node;
- a method to request deactivation related assistance information from a network node;
- a method to respond to request of deactivation related assistance information;
- a method to route deactivation related assistance information from one network node to another;
- a method to obtain deactivation decisions based on combined data rate estimates and deactivation related assistance information from the user equipment;
- a method to provide instructions about user equipment behavior upon node activation; and
- a method to resolve signaling ambiguity upon addition and change of PSCell.

The following is a summary of solution ideas to perform SCG deactivation decisions based on assistance information.

According to some aspects, a mobile device, wireless router or relaying node may be configured to execute one or more instructions, including estimating the collective data rate requirement and performance measures of all running applications in the device's operating system, wherein the estimation further comprises:

According to some aspects, a mobile device, wireless router or relaying node may be configured to execute one or more instructions, including determining a change, where the change may consist of one or more of any dynamic change of data rate, latency, one or more other attributes of quality of service, a termination of an application, a termination of a traffic, a termination of a service, a termination of a task, a change of mode of operation (for example, an app going into/from power saving mode or "sleep" mode), a launch of an application, a launch of a traffic, a launch of a service, or a launch of a task.

According to some aspects, a mobile device, wireless router or relaying node may be configured to execute one or more instructions, including evaluating whether the determined change may be significant or not, whether the value of the estimated measure may be increasing or decreasing, how much the value may be changed and what may be the validity time of the information wherein the threshold value for significance evaluation may be either decided by the mobile device, provided by a network node or pre-defined and stored in a SIM card.

According to some aspects, a mobile device, wireless router or relaying node may be configured to execute one or more instructions, including sending the evaluated information (e.g., from one or more previous aspects) to a network node as assistance information upon request from the network node or sending the assistance information to a network node spontaneously.

According to some aspects, a network node may: monitor the rate of data transmission and transmitter buffer level for the data transmission to the mobile device of one or more previous aspects; upon observing empty transmitter buffer for the mobile device start an inactivity timer; upon expiration of the inactivity timer issue a decision to deactivate SCG by indicating inactivity to another node (MN) or deactivate SCG by itself (MN); upon arrival of a packet while the inactivity timer may be running stop the inactivity timer; request assistance information from the mobile device at any time including the time during observed inactivity; upon reception of assistance information start a validity timer; route the assistance information to another network node; configure the mobile device with a timer to value control the frequency how often the mobile device can send assistance information; configure the mobile device with a significance threshold value for the UE to determine whether an observed change may be significant or not; and/or upon observing that both validity timer and inactivity timers are running deactivate SCG and stop both timers.

According to some aspects, a network node may issue a decision to deactivate SCG to also issue decision for the UE behavior upon future reactivation of SCG and include the indication of the UE behavior upon reactivation of SCG in the RRC message that indicates deactivation of the SCG.

According to some aspects, a mobile device (e.g., of one or more of the previous aspects) may store the indication about the UE behavior to be used upon reactivation of SCG and replace the stored information by any other UE behavior instructions signaled by the network node after the deactivation indication.

According to some aspects, a first network node (MN) may transmit an RRC reconfiguration message to a mobile device to configure conditional PSCell addition or change and/or may send a message to S-SN to indicate that the RRC reconfiguration may be completed after reception of RRC reconfiguration complete message from the mobile device.

According to some aspects, a second network node (S-SN) (e.g., of one or more of the previous aspects) may prepare an updated RRC reconfiguration message, the behavior of which may include waiting for indication from the first network node that the RRC reconfiguration message from the first network node may be completed by the mobile device (e.g., of one or more of the previous aspects).

According to some aspects, a network node (MN) configures the mobile device to perform radio measurements in the deactivated SCG. Measurements during deactivated SCG are configured in the following manner:

According to some aspects, the network reconfigures measurements during deactivation by configuring longer measurement cycles. The measurement object information element is extended to include indication of relaxed radio resource management measurements and measurement parameters which may be configured in a deactivated SCG.

According to some aspects, the network configures longer measurement cycle upon configuration of SCG. The longer measurement cycle is triggered when the SCG is deactivated. The measurement object information element is extended to include indication of relaxed radio resource management measurements and measurement parameters. The relaxed radio resource management measurements are triggered by the UE when the SCG is deactivated.

According to some aspects, the network reconfigures measurements in the deactivated SCG in a new RRC reconfiguration message dedicated to SCG or the measurement object information element is extended to include indication of relaxed radio resource management measurement for SCG and measurement parameters. The relaxed radio resource control measurements are configured when the SCG is already deactivated.

Solution Details

The detailed solutions described in the following sections may be used on their own in in combination with each other.

Solutions for Problem Statement #1

UE Side:

Unlike the network side, the UE may obtain (e.g., relatively easily) detailed information about applications (e.g., their data rate requirements), but, so far, such information may not be provided over any 3GPP radio interface to network nodes. If such information is provided to the network side, it may be used as additional input for resource management in network nodes to facilitate faster and more accurate decision-making in network deployments. According to some aspects, a key question may be how to acquire information about applications and their performance regarding measures such as dynamic changes of data rates, quality of services attributes, latency and failure rates, and then how to provide this information from the UE side to network nodes. Although the more assistance information that is provided to the network side, the faster and more accurate the decision-making could be in network, it may be important to consider overhead for such assistance information. Large overhead could occur when UE provides significant amount of assistance information to NW. It also consumes spectrum. In addition, the reporting frequency has an impact, e.g., how often UE should report the assistance information, using what mechanism and channel, reporting periodicity, etc.

One possible solution may be that a UE monitors statistics per application or process by means of its operating system's Application Programming Interfaces (API). Such APIs are usually available because all modern mobile phone operating systems are Portable Operating System Interface (POSIX) compliant UNIX variants where, for example, shell commands like iftop, iftraf and vnStat provide information about bandwidth usage and average data rate per process. Similarly, it may be possible to obtain statuses of all processes with POSIX compliant UNIX bash shell commands like top or ps to see whether individual processes are running or idle.

The above-described interfaces and shell commands may be used to develop algorithms and methods for estimation of dynamically changing data rate requirements. The following steps (1-5) may provide information on whether or not the overall data rate has changed. The method needs to execute these steps regularly and compare the outcome with previous outcomes. For each iteration n, execute the following:

Step 1—Create a table where rows represent processes and separate columns contain information about process identity, average data rate and process status;

Step 2—If a process may be terminated or idle (or sleeping), remove the corresponding row from the table;

Step 3—Compute the accumulated average data rate by adding all average data rate columns of the remaining rows;

Step 4—Store the result of iteration n; and

Step 5—End of procedure.

The accumulated average data rate for iteration n may be used as an estimate of the data rate requirement for the UE. If the estimated value may be compared with previous estimate(s) (one or several), it may be possible to infer whether the data rate requirement may be increasing or decreasing. A threshold value may be used to determine whether the change may be significant or not. The threshold value may be either defined by the operating system or signaled from the network side upon request of UE information. The following steps are executed after each iteration n, where n may be greater than 1:

Step 1—Compute the data rate requirement change by subtracting the result of iteration n from the result of iteration n−1;

Step 2—If the absolute value of the data rate requirement change may be above a threshold value, the data rate requirement may be significant;

Step 3—If the data rate requirement may be positive, the data rate requirement may be increasing; and Step 4—If the data rate requirement may be negative, the data rate requirement may be decreasing.

Step 5: End of procedure.

The estimated value may be exemplified as data rate requirement estimate but it could also be a Quality of Service (QOS) attribute measured in terms of delay or round trip time for each process. The same methods for estimation and signaling may be used regardless of the estimated measure. In general terms, the UE may provide the following information to the network side to assist decision-making and resource management:

(1) Whether the value of the estimated measure may be increasing or decreasing;

(2) How much the value may be changed;

(3) Whether the change may be significant or not; and (4) Validity time of the information.

The information may be signaled in multiple different ways. The exact encoding of the RRC signaling allow many possibilities depending on the data types but the content and semantics of the provided information may be still the same. In the following, the estimated measure may be exemplified in terms of data rate requirements, but any other measure may be used as well.

The UE may make use of an SCG deactivation assistance information element to indicate any change of data rate requirements and to provide validity time for the information. The information element may be composed of optional fields to indicate change of data rate requirements and the validity time of the provided information. The significance of data rate requirement may be indicated either as a presence bit for the activity indication or as a separate field but essentially the low level encoding may be the same regardless how the coding of abstract syntax may be done. The following steps may be used to populate the fields of the exemplified information element:

Step 1—If the data rate requirement change may be significant, indicate presence of the activity field;

Step 2—If the data rate requirement may be increasing, set activity field to value up. Otherwise, set the value to down;

Step 3—Populate a value for the validity timer; and

Step 4—End of procedure.

SCG-Deactivation-Info contains assistance information for SCG deactivation.

```
SCG-Deactivation-Info information element
-- ASN1START
-- TAG-SCG-DEACTIVATIONINFO-START
SCG-DeactivationInfo-r17 ::= SEQUENCE {
    activity-r17 ENUMERATED {up, down} OPTIONAL, -- Need R
    validityTimer-r17 ENUMERATED {ms100, ms200, ms300,
    ms400, ms600, ms1000,
    ms1500, ms2000} OPTIONAL, -- Need R
    ...
}
-- TAG-SCG-DEACTIVATIONINFO-STOP
-- ASN1STOP
```

SCG-DeactivationInfo Field Descriptions activity—Presence indicates significant dynamic change of activity or data rate requirements. Value up indicates increasing data rate requirement and value down indicates decreasing data date requirement.

validityTimer—Indicates validity time of the activity information in terms of milliseconds.

The activity field may also be specified as (1) BOOLEAN data type where semantics of TRUE and FALSE define change of the data rate requirement but essentially the encoding may be the same;

(2) ENUMERATED data type with a single code point to indicate either increasing or decreasing data rate requirement only which means that only a presence bit may be encoded;

(3) ENUMERATED data type with multiple code points to indicate how much the data rate requirement has changed; and/or (4) INTEGER data type with a value range to indicate how much the data rate requirement has changed.

The validity timer may also be specified as INTEGER data type to indicate a value range but the encoding may be essentially the same as for the ENUMERATED data type with multiple code points.

If UE information may be requested by the network, the UE sends UE information response message including SCG deactivation information. Upon reception of UE information request message, the UE makes use of the following message extension to include populated assistance information element in the UE response message;

```
-- ASN1START
-- TAG-UEINFORMATIONRESPONSE-START
UEInformationResponse-r16 ::= SEQUENCE {
    rrc-TransactionIdentifier RRC-TransactionIdentifier,
    criticalExtensions CHOICE {
    ueInformationResponse-r16 UEInformationResponse-r16-IEs,
    criticalExtensionsFuture SEQUENCE { }
    }
}
UEInformationResponse-r16-IEs ::= SEQUENCE {
    measResultIdleEUTRA-r16 MeasResultIdleEUTRA-r16 OPTIONAL,
    measResultIdleNR-r16 MeasResultIdleNR-r16 OPTIONAL,
    logMeasReport-r16 LogMeasReport-r16 OPTIONAL,
    connEstFailReport-r16 ConnEstFailReport-r16 OPTIONAL,
    ra-ReportList-r16 RA-ReportList-r16 OPTIONAL,
    rlf-Report-r16 RLF-Report-r16 OPTIONAL,
    mobilityHistoryReport-r16 MobilityHistoryReport-r16 OPTIONAL,
    lateNonCriticalExtension OCTET STRING OPTIONAL,
    nonCriticalExtension UEInformationResponse-v1700-IEs OPTIONAL
}
UEInformationResponse-v1700-IEs ::= SEQUENCE {
    scg-DeactivationInfo-r17 SCG-DeactivationInfo-r17 OPTIONAL,
    nonCriticalExtension SEQUENCE { } OPTIONAL
}
```

```
LogMeasReport-r16 ::= SEQUENCE {
  absoluteTimeStamp-r16 AbsoluteTimeInfo-r16,
  traceReference-r16 TraceReference-r16,
  traceRecordingSessionRef-r16 OCT409ET STRING (SIZE (2)),
  tce-Id-r16 OCTET STRING (SIZE (1)),
  logMeasInfoList-r16 LogMeasInfoList-r16,
  logMeasAvailable-r16 ENUMERATED {true} OPTIONAL,
  logMeasAvailableBT-r16 ENUMERATED {true} OPTIONAL,
  logMeasAvailableWLAN-r16 ENUMERATED {true} OPTIONAL,
  ...
}
LogMeasInfoList-r16 ::= SEQUENCE (SIZE (1..maxLogMeasReport-r16)) OF LogMeasInfo-r16
LogMeasInfo-r16 ::= SEQUENCE {
  locationInfo-r16 LocationInfo-r16 OPTIONAL,
  relativeTimeStamp-r16 INTEGER (0..7200),
  servCellIdentity-r16 CGI-Info-Logging-r16 OPTIONAL,
  measResultServingCell-r16 MeasResultServingCell-r16 OPTIONAL,
  measResultNeighCells-r16 SEQUENCE {
  measResultNeighCellListNR MeasResultListLogging2NR-r16 OPTIONAL,
  measResultNeighCellListEUTRA MeasResultList2EUTRA-r16 OPTIONAL
  },
  anyCellSelectionDetected-r16 ENUMERATED {true} OPTIONAL
}
ConnEstFailReport-r16 ::= SEQUENCE {
  measResultFailedCell-r16 MeasResultFailedCell-r16,
  locationInfo-r16 LocationInfo-r16 OPTIONAL,
  measResultNeighCells-r16 SEQUENCE {
  measResultNeighCellListNR MeasResultList2NR-r16 OPTIONAL,
  measResultNeighCellListEUTRA MeasResultList2EUTRA-r16 OPTIONAL
  },
  numberOfConnFail-r16 INTEGER (1..8),
  perRAInfoList-r16 PerRAInfoList-r16,
  timeSinceFailure-r16 TimeSinceFailure-r16,
  ...
}
MeasResultServingCell-r16 ::= SEQUENCE {
  resultsSSB-Cell MeasQuantityResults,
  resultsSSB SEQUENCE{
  best-ssb-Index SSB-Index,
  best-ssb-Results MeasQuantityResults,
  numberOfGoodSSB INTEGER (1..maxNrofSSBs-r16)
  } OPTIONAL
}
MeasResultFailedCell-r16 ::= SEQUENCE {
  cgi-Info CGI-Info-Logging-r16,
  measResult-r16 SEQUENCE {
  cellResults-r16 SEQUENCE{
  resultsSSB-Cell-r16 MeasQuantityResults
  },
  rsIndexResults-r16 SEQUENCE{
  resultsSSB-Indexes-r16 ResultsPerSSB-IndexList
  }
  }
}
RA-ReportList-r16 ::= SEQUENCE (SIZE (1..maxRAReport-r16)) OF RA-Report-r16
RA-Report-r16 ::= SEQUENCE {
  cellId-r16 CHOICE {
  cellGlobalId-r16 CGI-Info-Logging-r16,
  pci-arfcn-r16 SEQUENCE {
  physCellId-r16 PhysCellId,
  carrierFreq-r16 ARFCN-ValueNR
  }
  },
  ra-InformationCommon-r16 RA-InformationCommon-r16,
  raPurpose-r16 ENUMERATED {accessRelated, beamFailureRecovery,
reconfigurationWithSync, ulUnSynchronized,
  schedulingRequestFailure, noPUCCHResourceAvailable, requestForOtherSI,
  spare9, spare8, spare7, spare6, spare5, spare4, spare3, spare2, spare1}
}
RA-InformationCommon-r16 ::= SEQUENCE {
  absoluteFrequencyPointA-r16 ARFCN-ValueNR,
  locationAndBandwidth-r16 INTEGER (0..37949),
  subcarrierSpacing-r16 SubcarrierSpacing,
  msg1-FrequencyStart-r16 INTEGER (0..maxNrofPhysicalResourceBlocks−1) OPTIONAL,
  msg1-FrequencyStartCFRA-r16 INTEGER (0..maxNrofPhysicalResourceBlocks−1) OPTIONAL,
  msg1-SubcarrierSpacing-r16 SubcarrierSpacing OPTIONAL,
  msg1-SubcarrierSpacingCFRA-r16 SubcarrierSpacing OPTIONAL,
```

-continued

```
    msg1-FDM-r16 ENUMERATED {one, two, four, eight} OPTIONAL,
    msg1-FDMCFRA-r16 ENUMERATED {one, two, four, eight} OPTIONAL,
    perRAInfoList-r16 PerRAInfoList-r16
}
PerRAInfoList-r16 ::= SEQUENCE (SIZE (1..200)) OF PerRAInfo-r16
PerRAInfo-r16 ::= CHOICE {
    perRASSBInfoList-r16 PerRASSBInfo-r16,
    perRACSI-RSInfoList-r16 PerRACSI-RSInfo-r16
}
PerRASSBInfo-r16 ::= SEQUENCE {
    ssb-Index-r16 SSB-Index,
    numberOfPreamblesSentOnSSB-r16 INTEGER (1..200),
    perRAAttemptInfoList-r16 PerRAAttemptInfoList-r16
}
PerRACSI-RSInfo-r16 ::= SEQUENCE {
    csi-RS-Index-r16 CSI-RS-Index,
    numberOfPreamblesSentOnCSI-RS-r16 INTEGER (1..200)
}
PerRAAttemptInfoList-r16 ::= SEQUENCE (SIZE (1..200)) OF PerRAAttemptInfo-r16
PerRAAttemptInfo-r16 ::= SEQUENCE {
    contentionDetected-r16 BOOLEAN OPTIONAL,
    dlRSRPAboveThreshold-r16 BOOLEAN OPTIONAL,
    ...
}
RLF-Report-r16 ::= CHOICE {
    nr-RLF-Report-r16 SEQUENCE {
    measResultLastServCell-r16 MeasResultRLFNR-r16,
    measResultNeighCells-r16 SEQUENCE {
    measResultListNR-r16 MeasResultList2NR-r16 OPTIONAL,
    measResultListEUTRA-r16 MeasResultList2EUTRA-r16 OPTIONAL
    } OPTIONAL,
    c-RNTI-r16 RNTI-Value,
    previousPCellId-r16 CHOICE {
    nrPreviousCell-r16 CGI-Info-Logging-r16,
    eutraPreviousCell-r16 CGI-InfoEUTRALogging
    } OPTIONAL,
    failedPCellId-r16 CHOICE {
    nrFailedPCellId-r16 CHOICE {
    cellGlobalId-r16 CGI-Info-Logging-r16,
    pci-arfcn-r16 SEQUENCE {
    physCellId-r16 PhysCellId,
    carrierFreq-r16 ARFCN-ValueNR
    }
    },
    eutraFailedPCellId-r16 CHOICE {
    cellGlobalId-r16 CGI-InfoEUTRALogging,
    pci-arfcn-r16 SEQUENCE {
    physCellId-r16 EUTRA-PhysCellId,
    carrierFreq-r16 ARFCN-ValueEUTRA
    }
    }
    },
    reconnectCellId-r16 CHOICE {
    nrReconnectCellId-r16 CGI-Info-Logging-r16,
    eutraReconnectCellId-r16 CGI-InfoEUTRALogging
    } OPTIONAL,
    timeUntilReconnection-16 TimeUntilReconnection-16 OPTIONAL,
    reestablishmentCellId-r16 CGI-Info-Logging-r16 OPTIONAL,
    timeConnFailure-r16 INTEGER (0..1023) OPTIONAL,
    timeSinceFailure-r16 TimeSinceFailure-r16,
    connectionFailureType-r16 ENUMERATED {rlf, hof},
    rlf-Cause-r16 ENUMERATED {t310-Expiry, randomAccessProblem, rlc-MaxNumRetx,
    beamFailureRecoveryFailure, lbtFailure-r16,
    bh-rlfRecoveryFailure, spare2, spare1},
    locationInfo-r16 LocationInfo-r16 OPTIONAL,
    noSuitableCellFound-r16 ENUMERATED {true} OPTIONAL,
    ra-InformationCommon-r16 RA-InformationCommon-r16 OPTIONAL,
    ...
    },
    eutra-RLF-Report-r16 SEQUENCE {
    failedPCellId-EUTRA CGI-InfoEUTRALogging,
    measResult-RLF-Report-EUTRA-r16 OCTET STRING,
    ...
    }
}
MeasResultList2NR-r16 ::= SEQUENCE (SIZE (1..maxFreq)) OF MeasResult2NR-r16
MeasResultList2EUTRA-r16 ::= SEQUENCE (SIZE (1..maxFreq)) OF MeasResult2EUTRA-r16
MeasResult2NR-r16 ::= SEQUENCE {
    ssbFrequency-r16 ARFCN-ValueNR OPTIONAL,
```

```
  refFreqCSI-RS-r16 ARFCN-ValueNR OPTIONAL,
  measResultList-r16 MeasResultListNR
}
MeasResultListLogging2NR-r16 ::= SEQUENCE (SIZE (1..maxFreq)) OF
MeasResultLogging2NR-r16
MeasResultLogging2NR-r16 ::= SEQUENCE {
  carrierFreq-r16 ARFCN-ValueNR,
  measResultListLoggingNR-r16 MeasResultListLoggingNR-r16
}
MeasResultListLoggingNR-r16 ::= SEQUENCE (SIZE (1..maxCellReport)) OF
MeasResultLoggingNR-r16
MeasResultLoggingNR-r16 ::= SEQUENCE {
  physCellId-r16 PhysCellId,
  resultsSSB-Cell-r16 MeasQuantityResults,
  numberOfGoodSSB-r16 INTEGER (1..maxNrofSSBs-r16) OPTIONAL
}
MeasResult2EUTRA-r16 ::= SEQUENCE {
  carrierFreq-r16 ARFCN-ValueEUTRA,
  measResultList-r16 MeasResultListEUTRA
}
MeasResultRLFNR-r16 ::= SEQUENCE {
  measResult-r16 SEQUENCE {
  cellResults-r16 SEQUENCE{
  resultsSSB-Cell-r16 MeasQuantityResults OPTIONAL,
  resultsCSI-RS-Cell-r16 MeasQuantityResults OPTIONAL
  },
  rsIndexResults-r16 SEQUENCE {
  resultsSSB-Indexes-r16 ResultsPerSSB-IndexList OPTIONAL,
  ssbRLMConfigBitmap-r16 BIT STRING (SIZE (64)) OPTIONAL,
  resultsCSI-RS-Indexes-r16 ResultsPerCSI-RS-IndexList OPTIONAL,
  csi-rsRLMConfigBitmap-r16 BIT STRING (SIZE (96)) OPTIONAL
  } OPTIONAL
  }
}
TimeSinceFailure-r16 ::= INTEGER (0..172800)
MobilityHistoryReport-r16 ::= VisitedCellInfoList-r16
TimeUntilReconnection-16 ::= INTEGER (0..172800)
-- TAG-UEINFORMATIONRESPONSE-STOP
-- ASN1STOP
```

Upon absence of UE information request message, the UE may also spontaneously send the information element included in an extension of UE assistance information message in the following manner.

The transmission of UE assistance information may be configured by the network. The transmission of assistance information may be controlled with a timer. Alternatively, the timer may be decided by the UE or pre-configured in the SIM card. The timer may be started by the UE upon transmission of assistance information to control overhead impacts. Transmission of assistance information may be prohibited while the timer may be running. The timer value may be configured by the network in RRC Reconfiguration message. If the UE prefers SCG deactivation, it may send assistance information when the timer may not be running.

The following method may be used for assistance information transmission:
Step 1—If the timer may be running, jump to 1;
Step 2—If the UE has preference for SCG deactivation, send assistance information to the network and start the timer; and
Step 3—Jump to 1.
UEAssistanceInformation The UEAssistanceInformation message may be used for the indication of UE assistance information to the network.
Signalling radio bearer: SRB1, SRB3
RLC-SAP: AM
Logical channel: DCCH
Direction: UE to Network

```
UEAssistanceInformation message
--ASN1START
-- TAG-UEASSISTANCEINFORMATION-START
UEAssistanceInformation ::= SEQUENCE {
  criticalExtensions CHOICE {
  ueAssistanceInformation UEAssistanceInformation-IEs,
  criticalExtensionsFuture SEQUENCE { }
  }
}
UEAssistanceInformation-IEs ::= SEQUENCE {
  delayBudgetReport DelayBudgetReport OPTIONAL,
  lateNonCriticalExtension OCTET STRING OPTIONAL,
  nonCriticalExtension UEAssistanceInformation-v1540-IEs OPTIONAL
}
DelayBudgetReport::= CHOICE {
  type1 ENUMERATED {
  msMinus1280, msMinus640, msMinus320, msMinus160,msMinus80, msMinus60, msMinus40,
```

```
    msMinus20, ms0, ms20,ms40, ms60, ms80, ms160, ms320, ms640, ms1280},
    ...
}
UEAssistanceInformation-v1540-IEs ::= SEQUENCE {
    overheatingAssistance OverheatingAssistance OPTIONAL,
    nonCriticalExtension UEAssistanceInformation-v1610-IEs OPTIONAL
}
OverheatingAssistance ::= SEQUENCE {
    reducedMaxCCs ReducedMaxCCs-r16 OPTIONAL,
    reducedMaxBW-FR1 ReducedMaxBW-FRx-r16 OPTIONAL,
    reducedMaxBW-FR2 ReducedMaxBW-FRx-r16 OPTIONAL,
    reducedMaxMIMO-LayersFR1 SEQUENCE {
    reducedMIMO-LayersFR1-DL MIMO-LayersDL,
    reducedMIMO-LayersFR1-UL MIMO-LayersUL
    } OPTIONAL,
    reducedMaxMIMO-LayersFR2 SEQUENCE {
    reducedMIMO-LayersFR2-DL MIMO-LayersDL,
    reducedMIMO-LayersFR2-UL MIMO-LayersUL
    } OPTIONAL
}
ReducedAggregatedBandwidth ::= ENUMERATED {mhz0, mhz10, mhz20, mhz30, mhz40,
mhz50, mhz60, mhz80, mhz100, mhz200, mhz300, mhz400}
UEAssistanceInformation-v1610-IEs ::= SEQUENCE {
    idc-Assistance-r16 IDC-Assistance-r16 OPTIONAL,
    drx-Preference-r16 DRX-Preference-r16 OPTIONAL,
    maxBW-Preference-r16 MaxBW-Preference-r16 OPTIONAL,
    maxCC-Preference-r16 MaxCC-Preference-r16 OPTIONAL,
    maxMIMO-LayerPreference-r16 MaxMIMO-LayerPreference-r16 OPTIONAL,
    minSchedulingOffsetPreference-r16 MinSchedulingOffsetPreference-r16 OPTIONAL,
    releasePreference-r16 ReleasePreference-r16 OPTIONAL,
    sl-UE-AssistanceInformationNR-r16 SL-UE-AssistanceInformationNR-r16 OPTIONAL,
    referenceTimeInfoPreference-r16 BOOLEAN OPTIONAL,
    nonCriticalExtension UEAssistanceInformation-v1700-IEs OPTIONAL,
}
UEAssistanceInformation-v1700-IEs ::= SEQUENCE {
    scg-DeactivationInfo-r17 SCG-DeactivationInfo-r17 OPTIONAL,
    nonCriticalExtension SEQUENCE { } OPTIONAL
}
IDC-Assistance-r16 ::= SEQUENCE {
    affectedCarrierFreqList-r16 AffectedCarrierFreqList-r16 OPTIONAL,
    affectedCarrierFreqCombList-r16 AffectedCarrierFreqCombList-r16 OPTIONAL,
    ...
}
AffectedCarrierFreqList-r16 ::= SEQUENCE (SIZE (1..maxFreqIDC-r16)) OF
AffectedCarrierFreq-r16
AffectedCarrierFreq-r16 ::= SEQUENCE {
    carrierFreq-r16 ARFCN-ValueNR,
    interferenceDirection-r16 ENUMERATED {nr, other, both, spare}
}
AffectedCarrierFreqCombList-r16 ::= SEQUENCE (SIZE (1..maxCombIDC-r16)) OF
AffectedCarrierFreqComb-r16
AffectedCarrierFreqComb-r16 ::= SEQUENCE {
    affectedCarrierFreqComb-r16 SEQUENCE (SIZE (2..maxNrofServingCells)) OF ARFCN-
ValueNR OPTIONAL,
    victimSystemType-r16 VictimSystemType-r16
}
VictimSystemType-r16 ::= SEQUENCE {
    gps-r16 ENUMERATED {true} OPTIONAL,
    glonass-r16 ENUMERATED {true} OPTIONAL,
    bds-r16 ENUMERATED {true} OPTIONAL,
    galileo-r16 ENUMERATED {true} OPTIONAL,
    navIC-r16 ENUMERATED {true} OPTIONAL,
    wlan-r16 ENUMERATED {true} OPTIONAL,
    bluetooth-r16 ENUMERATED {true} OPTIONAL,
    ...
}
DRX-Preference-r16 ::= SEQUENCE {
    preferredDRX-InactivityTimer-r16 ENUMERATED {
    ms0, ms1, ms2, ms3, ms4, ms5, ms6, ms8, ms10, ms20, ms30, ms40, ms50, ms60, ms80,
    ms100, ms200, ms300, ms500, ms750, ms1280, ms1920, ms2560, spare9, spare8,
    spare7, spare6, spare5, spare4, spare3, spare2, spare1} OPTIONAL,
    preferredDRX-LongCycle-r16 ENUMERATED {
    ms10, ms20, ms32, ms40, ms60, ms64, ms70, ms80, ms128, ms160, ms256, ms320,
ms512,
    ms640, ms1024, ms1280, ms2048, ms2560, ms5120, ms10240, spare12, spare11,
spare10,
    spare9, spare8, spare7, spare6, spare5, spare4, spare3, spare2, spare1 }
OPTIONAL,
    preferredDRX-ShortCycle-r16 ENUMERATED {
```

```
    ms2, ms3, ms4, ms5, ms6, ms7, ms8, ms10, ms14, ms16, ms20, ms30, ms32,
    ms35, ms40, ms64, ms80, ms128, ms160, ms256, ms320, ms512, ms640, spare9,
    spare8, spare7, spare6, spare5, spare4, spare3, spare2, spare1 } OPTIONAL,
    preferredDRX-ShortCycleTimer-r16 INTEGER (1..16) OPTIONAL
}
MaxBW-Preference-r16 ::= SEQUENCE {
    reducedMaxBW-FR1-r16 ReducedMaxBW-FRx-r16 OPTIONAL,
    reducedMaxBW-FR2-r16 ReducedMaxBW-FRx-r16 OPTIONAL
}
MaxCC-Preference-r16 ::= SEQUENCE {
    reducedMaxCCs-r16 ReducedMaxCCs-r16 OPTIONAL
}
MaxMIMO-LayerPreference-r16 ::= SEQUENCE {
    reducedMaxMIMO-LayersFR1-r16 SEQUENCE {
    reducedMIMO-LayersFR1-DL-r16 INTEGER (1..8),
    reducedMIMO-LayersFR1-UL-r16 INTEGER (1..4)
    } OPTIONAL,
    reducedMaxMIMO-LayersFR2-r16 SEQUENCE {
    reducedMIMO-LayersFR2-DL-r16 INTEGER (1..8),
    reducedMIMO-LayersFR2-UL-r16 INTEGER (1..4)
    } OPTIONAL
}
MinSchedulingOffsetPreference-r16 ::= SEQUENCE {
    preferredK0-r16 SEQUENCE {
    preferredK0-SCS-15kHz-r16 ENUMERATED {sl1, sl2, sl4, sl6} OPTIONAL,
    preferredK0-SCS-30kHz-r16 ENUMERATED {sl1, sl2, sl4, sl6} OPTIONAL,
    preferredK0-SCS-60kHz-r16 ENUMERATED {sl2, sl4, sl8, sl12} OPTIONAL,
    preferredK0-SCS-120kHz-r16 ENUMERATED {sl2, sl4, sl8, sl12} OPTIONAL
    } OPTIONAL,
    preferredK2-r16 SEQUENCE {
    preferredK2-SCS-15kHz-r16 ENUMERATED {sl1, sl2, sl4, sl6} OPTIONAL,
    preferredK2-SCS-30kHz-r16 ENUMERATED {sl1, sl2, sl4, sl6} OPTIONAL,
    preferredK2-SCS-60kHz-r16 ENUMERATED {sl2, sl4, sl8, sl12} OPTIONAL,
    preferredK2-SCS-120kHz-r16 ENUMERATED { sl2, sl4, sl8, sl12} OPTIONAL
    } OPTIONAL
}
ReleasePreference-r16 ::= SEQUENCE {
    preferredRRC-State-r16 ENUMERATED {idle, inactive, connected, outOfConnected}
}
ReducedMaxBW-FRx-r16 ::= SEQUENCE {
    reducedBW-DL-r16 ReducedAggregatedBandwidth,
    reducedBW-UL-r16 ReducedAggregatedBandwidth
}
ReducedMaxCCs-r16 ::= SEQUENCE {
    reducedCCsDL-r16 INTEGER (0..31),
    reducedCCsUL-r16 INTEGER (0..31)
}
SL-UE-AssistanceInformationNR-r16 ::= SEQUENCE (SIZE (1..maxNrofTrafficPattern-
r16)) OF SL-TrafficPatternInfo-r16
SL-TrafficPatternInfo-r16::= SEQUENCE {
    trafficPeriodicity-r16 ENUMERATED {ms20, ms50, ms100, ms200, ms300, ms400, ms500,
ms600, ms700, ms800, ms900, ms1000},
    timingOffset-r16 INTEGER (0..10239),
    messageSize-r16 BIT STRING (SIZE (8)) ,
    sl-QoS-FlowIdentity-r16 SL-QoS-FlowIdentity-r16
}
-- TAG-UEASSISTANCEINFORMATION-STOP
-- ASN1STOP
```

Network Side of the Radio Interface:

The network side of the radio interface may generally monitor user activity and data rate but it normally takes a long time to acquire sufficient information for decision making. The design problem typically boils down to a trade-off between accurate estimates and accurate decisions. Usually accurate estimates are preferable. The reason for slowness may be that the data rate estimate requires long averaging windows, timers and monitoring of transmitter buffer levels. The invention improves the decision making at the network side by using assistance information from the UE.

A network node may request assistance information about application performance and dynamically changing data rate requirements (as described supra) by using the following extension to UE information request message. The introduction of a new field activityIndication triggers a request from the UE to indicate assistance information about UE activity.

The UEInformationRequest message may be used by the network to retrieve information from the UE.

Signaling radio bearer: SRB1
RLC-SAP: AM
Logical channel: DCCH
Direction: Network to UE

```
UEInformationRequest message
-- ASN1START
-- TAG-UEINFORMATIONREQUEST-START
UEInformationRequest-r16 ::= SEQUENCE {
  rrc-TransactionIdentifier RRC-TransactionIdentifier,
  criticalExtensions CHOICE {
  ueInformationRequest-r16 UEInformationRequest-r16-IEs,
  criticalExtensionsFuture SEQUENCE { }
  }
}
UEInformationRequest-r16-IEs ::= SEQUENCE {
  idleModeMeasurementReq-r16 ENUMERATED {true} OPTIONAL, -- Need N
  logMeasReportReq-r16 ENUMERATED {true} OPTIONAL, -- Need N
  connEstFailReportReq-r16 ENUMERATED {true} OPTIONAL, -- Need N
  ra-ReportReq-r16 ENUMERATED {true} OPTIONAL, -- Need N
  rlf-ReportReq-r16 ENUMERATED {true} OPTIONAL, -- Need N
  mobilityHistoryReportReq-r16 ENUMERATED {true} OPTIONAL, -- Need N
  lateNonCriticalExtension OCTET STRING OPTIONAL,
  nonCriticalExtension UEInformationRequest-v1700-IEs OPTIONAL
}
UEInformationRequest-v1700-IEs ::= SEQUENCE {
  activityIndication ENUMERATED {true} OPTIONAL, -- Need N
  nonCriticalExtension SEQUENCE { } OPTIONAL
}
-- TAG-UEINFORMATIONREQUEST-STOP
-- ASN1STOP
```

One possible example of the use case may be that the network node monitors transmitter buffer levels and executes the following steps. For each UE, the node executes the following steps after the activation and reactivation of SCG;

Step 1—If the transmitter buffer for the UE may be empty, start an inactivity timer and jump to step 3;

Step 2—Jump to step 1;

Step 3—If a packet arrives to the transmitter buffer while the inactivity timer may be running, stop the inactivity timer and jump to step 1;

Step 4—Optionally request for UE information;

Step 5—If a UE response message (response to UE information request message) or UE assistance information message (spontaneously sent by the UE) may be received and the message contains assistance information about UE activity, start validity timer and optionally route the assistance information to other network nodes (from MN to SN);

Step 6—If the inactivity timer expires, issue a decision to either send SCG inactivity indication from SN to MN or deactivate SCG and jump to step 10;

Step 7—If both the inactivity and validity timers are running and the assistance information indicates significant decrease of data rate, issue a decision to either send SCG inactivity indication from SN to MN or deactivate SCG and jump to step 10;

Step 8—If a packet arrives to the transmitter buffer, stop the inactivity timer and jump to step 1;

Step 9—Jump to step 4; and

Step 10—End of procedure.

The method handles use-cases where the assistance information may arrive at any time and the assistance information content may change while the inactivity timer may be running.

The receiving network node may also route assistance information to another network node at any time. If the node may be MN, it may route the information to SN. The MN may also use the assistance information for decision making without routing the information to SN.

Solutions for Problem Statement #2

According to some aspects, there are two possible options for the UE behavior upon (re) activation of SCG depending on whether the UE shall perform random access procedures or not. The network indicates UE behavior upon SCG activation in a RRC message. In order to speed up the process, the UE may be provided instructions for the actions upon activation already in the deactivation indication message. The message building at the network side may be performed according to the following method:

Step 1—Upon decision to deactivate SCG, issue also a decision for the UE behavior upon reactivation of SCG;

Step 2—Include the indication of the UE behavior upon reactivation of SCG in the RRC message that indicates deactivation of the SCG; and Step 3—End of procedure The added-value of this procedure may be that the UE already knows the desired behavior upon reactivation prior to the actual reactivation and thereby it does not need to wait for a RRC configuration to acquire that information. This may be useful when the UE triggers the reactivation of SCG. There are no benefits for the use-case where the network triggers reactivation of SCG.

The UE actions upon the reception of the RRC messages needs to handle the case where the UE behavior may be stored in the UE for later use, and possibly also being overwritten by another RRC message. The UE behavior may be as follows:

Step 1—Upon the reception of SCG deactivation indication RRC message, store any indicated UE behavior option to be used upon reactivation of SCG;

Step 1—If another received RRC reconfiguration message after indication of SCG deactivation contains information about UE behavior upon reactivation, store the information and replace any conflicting information with the new information;

Step 1—If SCG reactivation may not be indicated by the NW or triggered by the UE, jump to 2;

Step 1—Use the stored UE behavior upon SCG reactivation; and

Step 1—End of procedure.

Solutions for Problem Statement #3

The Source SN (S-SN) may need to update its configuration depending on the accepted candidate cells by the target SN and the prior-art solution may be that the SN may change these configurations after the RRC configuration message may be received by the UE. The downside of this solution may be that the updated reconfiguration messages may be received prior to the original RRC reconfiguration because the original message may be sent by the MN whereas the update may be sent by the SN.

Figure 4:
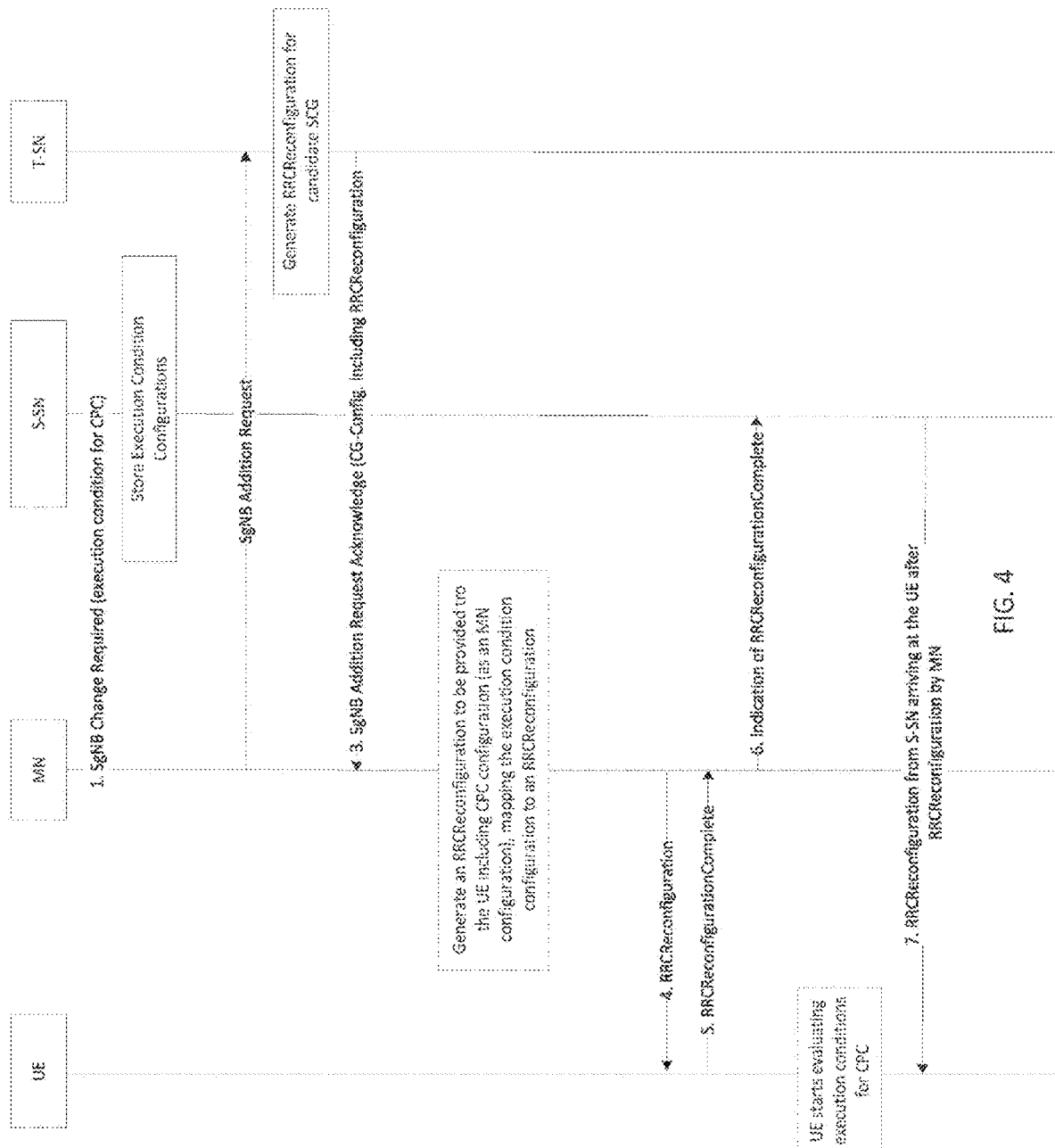
FIG. 4 shows an example of Conditional Addition and Change of PSCell (CPAC)

According to some aspects, a possible solution may be to delay the transmission of the updated RRC configuration to ensure that the update may be received after the original RRC message; delays have generally adverse impact on the system performance. Moreover, there are no guarantees that after a long delay the updated reconfiguration happens prior to the handover because the UE may have already started evaluating handover execution conditions. The message chart for the solution may be shown in FIG. 4 where an additional message 6 may be added to synchronize S-SN with MN. In that way, it may be guaranteed that any RRC Reconfiguration message (6) and subsequent RRC Reconfiguration Complete message (7) will happen after the RRC Reconfiguration message (5) from MN.

The following methods may inform S-SN about the instant of time when the RRC reconfiguration message from MN may be completed by the UE and thereby ensure that any further reconfigurations from the S-SN occur after the reconfiguration message from the MN.

The following method may be executed by the MN:

Step 1—Transmit RRC reconfiguration message to the UE;

Step 2—Upon reception of RRC reconfiguration complete message from the UE, sends a message to S-SN to indicate that the RRC reconfiguration may be completed; and Step 3—End of procedure.

The following steps are executed by the S-SN:

Step 1—If RRC configuration update may be needed, prepare updated RRC reconfiguration message. Otherwise jump to 4;

Step 2—Wait for indication from the MN that the RRC reconfiguration message from the MN may be completed by the UE;

Step 3—Transmit updated RRC reconfiguration message to the UE; and

Step 4—End of procedure.

Solutions for Problem Statement #4

Solution 1

According to some aspects, the UE may perform RRM measurements during SCG deactivation based on the configured measurements. For example, it may be up to the network implementation to reconfigure measurements after the deactivation. According to some aspects, the RRC signaling may be extended in the following manner to enable this solution:

The network may configure long measurement cycles for deactivated SCG in a new RRC reconfiguration message after the SCG deactivation.

The measurement configuration information elements may be extended to include radio resource management measurement relaxation indication and parameters. The extension is included in a new RRC reconfiguration message after SCG deactivation. The relaxed radio resource management measurement may be configured and used by the UE for deactivated SCG.

MeasObjectNR

The IE MeasObjectNR may specify information applicable for SS/PBCH block(s) intra/inter-frequency measurements and/or CSI-RS intra/inter-frequency measurements.

```
MeasObjectNR information element
-- ASN1START
-- TAG-MEASOBJECTNR-START
MeasObjectNR ::=                                                SEQUENCE {
    ssbFrequency                                                    ARFCN-ValueNR
    OPTIONAL,           -- Cond SSBorAssociatedSSB
    ssbSubcarrierSpacing                                            SubcarrierSpacing
    OPTIONAL,           -- Cond SSBorAssociatedSSB
    smtc1                                                           SSB-MTC
    OPTIONAL,           -- Cond SSBorAssociatedSSB
    smtc2                                                           SSB-MTC2
    OPTIONAL,           -- Cond IntraFreqConnected
    refFreqCSI-RS                                                   ARFCN-ValueNR
    OPTIONAL,           -- Cond CSI-RS
    referenceSignalConfig                                           ReferenceSignalConfig,
    absThreshSS-BlocksConsolidation                                 ThresholdNR
    OPTIONAL,           -- Need R
    absThreshCSI-RS-Consolidation                                   ThresholdNR
```

```
OPTIONAL,           -- Need R
  nrofSS-BlocksToAverage                    INTEGER (2..maxNrofSS-BlocksToAverage)
OPTIONAL,           -- Need R
  nrofCSI-RS-ResourcesToAverage             INTEGER (2..maxNrofCSI-RS-ResourcesToAverage)
OPTIONAL,           -- Need R
  quantityConfigIndex                       INTEGER (1..maxNrofQuantityConfig),
  offsetMO                                  Q-OffsetRangeList,
  cellsToRemoveList                         PCI-List
OPTIONAL,           -- Need N
  cellsToAddModList                         CellsToAddModList
OPTIONAL,           -- Need N
  blackCellsToRemoveList                    PCI-RangeIndexList
OPTIONAL,           -- Need N
  blackCellsToAddModList                    SEQUENCE (SIZE (1..maxNrofPCI-Ranges)) OF PCI-
RangeElement        OPTIONAL,               -- Need N
  whiteCellsToRemoveList                    PCI-RangeIndexList
OPTIONAL,           -- Need N
  whiteCellsToAddModList                    SEQUENCE (SIZE (1..maxNrofPCI-Ranges)) OF PCI-
RangeElement        OPTIONAL,               -- Need N
  ...,
  [[
  freqBandIndicatorNR                       FreqBandIndicatorNR
OPTIONAL,           -- Need R
  measCycleSCell                            ENUMERATED {sf160, sf256, sf320, sf512, sf640, sf1024,
sf1280}             OPTIONAL,               -- Need R
  ]],
  [[
  smtc3list-r16                             SSB-MTC3List-r16
OPTIONAL,           -- Need R
  rmtc-Config-r16                           SetupRelease {RMTC-Config-r16}
OPTIONAL,           -- Need M
  t312-r16                                  SetupRelease { T312-r16 }
OPTIONAL            -- Need M
  ]]
  [[
  relaxedMeasurement-r17                    SEQUENCE {
    lowMobilityEvaluation-r17                 SEQUENCE {
               s-SearchDeltaP-r17               ENUMERATED {
                                                  dB3, dB6, dB9, dB12, dB15,
                                                  spare3, spare2, spare1},
               t-SearchDeltaP-r17               ENUMERATED {
                                                  s5, s10, s20, s30, s60, s120, s180,
                                                  s240, s300, spare7, spare6, spare5,
                                                  spare4, spare3, spare2, spare1}
    }
OPTIONAL,           -- Need R
    cellEdgeEvaluation-r17                    SEQUENCE {
               s-SearchThresholdP-r17           ReselectionThreshold,
               s-SearchThresholdQ-r17           ReselectionThresholdQ
OPTIONAL            -- Need R
    }
OPTIONAL,           -- Need R
    combineRelaxedMeasCondition-r17           ENUMERATED {true}
OPTIONAL,           -- Need R
    highPriorityMeasRelax-r17                 ENUMERATED {true}
OPTIONAL            -- Need R
  }
OPTIONAL            -- Need R
  ]]
}
SSB-MTC3List-r16::=                         SEQUENCE (SIZE(1..4)) OF SSB-MTC3-r16
T312-r16 ::=                                ENUMERATED { ms0, ms50, ms100, ms200, ms300, ms400, ms500,
ms1000}
ReferenceSignalConfig::=                    SEQUENCE {
  ssb-ConfigMobility                        SSB-ConfigMobility
OPTIONAL,           -- Need M
  csi-rs-ResourceConfigMobility             SetupRelease { CSI-RS-ResourceConfigMobility }
OPTIONAL,           -- Need M
}
SSB-ConfigMobility::=                       SEQUENCE {
  ssb-ToMeasure                             SetupRelease { SSB-ToMeasure }
OPTIONAL,           -- Need M
  deriveSSB-IndexFromCell                   BOOLEAN,
  ss-RSSI-Measurement                       SS-RSSI-Measurement
OPTIONAL,           -- Need M
  ...,
  [[
  ssb-PositionQCL-Common-r16                SSB-PositionQCL-Relation-r16
OPTIONAL,           -- Cond SharedSpectrum
```

```
    ssb-PositionQCL-CellsToAddModList-r16                SSB-PositionQCL-CellsToAddModList-r16
OPTIONAL,            -- Need N
    ssb-PositionQCL-CellsToRemoveList-r16                PCI-List
OPTIONAL             -- Need N
    ]]
}
Q-OffsetRangeList ::=                    SEQUENCE {
    rsrpOffsetSSB                            Q-OffsetRange          DEFAULT dB0,
    rsrqOffsetSSB                            Q-OffsetRange          DEFAULT dB0,
    sinrOffsetSSB                            Q-OffsetRange          DEFAULT dB0,
    rsrpOffsetCSI-RS                         Q-OffsetRange          DEFAULT dB0,
    rsrqOffsetCSI-RS                         Q-OffsetRange          DEFAULT dB0,
    sinrOffsetCSI-RS                         Q-OffsetRange          DEFAULT dB0,
}
ThresholdNR ::=                          SEQUENCE {
    thresholdRSRP                            RSRP-Range
OPTIONAL,            -- Need R
    thresholdRSRQ                            RSRQ-Range
OPTIONAL,            -- Need R
    thresholdSINR                            SINR-Range
OPTIONAL             -- Need R
}
CellsToAddModList ::=                    SEQUENCE (SIZE (1..maxNrofCellMeas)) OF CellsToAddMod
CellsToAddMod ::=                        SEQUENCE {
    physCellId                               PhysCellId,
    cellIndividualOffset                     Q-OffsetRangeList
}
RMTC-Config-r16 ::=                      SEQUENCE {
    rmtc-Periodicity-r16                     ENUMERATED {ms40, ms80, ms160, ms320, ms640},
    rmtc-SubframeOffset-r16                  INTEGER (0..639)
OPTIONAL,            -- Need M
    measDurationSymbols-r16                  ENUMERATED {sym1, sym14or12, sym28or24, sym42or36,
sym70or60},
    rmtc-Frequency-r16                       ARFCN-ValueNR,
    ref-SCS-CP-r16                           ENUMERATED {kHz15, kHz30, kHz60-NCP, kHz60-ECP},
    ...
}
SSB-PositionQCL-CellsToAddModList-r16 ::=    SEQUENCE (SIZE (1..maxNrofCellMeas)) OF SSB-
PositionQCL-CellsToAddMod-r16
SSB-PositionQCL-CellsToAddMod-r16 ::=    SEQUENCE {
    physCellId-r16                           PhysCellId,
    ssb-PositionQCL-r16                      SSB-PositionQCL-Relation-r16
}
-- TAG-MEASOBJECTNR-STOP
-- ASN1STOP
```

CellsToAddMod Field Descriptions cellIndividualOffset
　Cell individual offsets applicable to a specific cell.
physCellId
　Physical cell identity of a cell in the cell list.

MeasObjectNR Field Descriptions absThreshCSI-RS-Consolidation
　Absolute threshold for the consolidation of measurement results per CSI-RS resource(s) from L1 filter(s). The field is used for the derivation of cell measurement results as described in 5.5.3.3 and the reporting of beam measurement information per CSI-RS resource as described in 5.5.5.2.
absThreshSS-BlocksConsolidation
　Absolute threshold for the consolidation of measurement results per SS/PBCH block(s) from L1 filter(s). The field is used for the derivation of cell measurement results as described in 5.5.3.3 and the reporting of beam measurement information per SS/PBCH block index as described in 5.5.5.2.
blackCellsToAddModList
　List of cells to add/modify in the black list of cells. It applies only to SSB resources.
blackCellsToRemoveList
　List of cells to remove from the black list of cells.
cellEdgeEvaluation
　Indicates the criteria for a UE to detect that it is not at cell edge, in order to relax measurement requirements (see TS 38.304 [20], clause 5.2.4.9.2).
cellsToAddModList
　List of cells to add/modify in the cell list.
cellsToRemoveList
　List of cells to remove from the cell list.
combineRelaxedMeasCondition
　When both lowMobilityEvalutation and cellEdgeEvaluation criteria are present in SIB2, this parameter configures the UE to fulfil both criteria in order to relax measurement requirements. If the field is absent, the UE is allowed to relax measurement requirements for cell reselection when either or both of the criteria are met. (See TS 38.304 [20], clause 5.2.4.9.0)
freqBandIndicatorNR
　The frequency band in which the SSB and/or CSI-RS indicated in this MeasObjectNR are located and according to which the UE shall perform the RRM measurements. This field is always provided when the network configures measurements with this MeasObjectNR.
highPriorityMeasRelax
　Indicates whether measurements can be relaxed on high priority frequencies (see TS 38.304 [20], clause 5.2.4.9.0). If the field is absent, the UE shall not relax measurements on high priority frequencies beyond "$T_{higher\_priority\_search}$" (see TS 38.133 [14], clause 4.2.2.7).

lowMobilityEvaluation

Indicates the criteria for a UE to detect low mobility, in order to relax measurement requirements (see TS 38.304 [20], clause 5.2.4.9.1).

measCycleSCell

The parameter is used only when an SCell is configured on the frequency indicated by the measObjectNR and is in deactivated state, see TS 38.133 [14]. gNB configures the parameter whenever an SCell is configured on the frequency indicated by the measObjectNR, but the field may also be signalled when an SCell is not configured. Value sf160 corresponds to 160 sub-frames, value sf256 corresponds to 256 sub-frames and so on.

nrofCSInrofCSI-RS-ResourcesToAverage

Indicates the maximum number of measurement results per beam based on CSI-RS resources to be averaged. The same value applies for each detected cell associated with this MeasObjectNR.

nrofSS-BlocksToAverage

Indicates the maximum number of measurement results per beam based on SS/PBCH blocks to be averaged. The same value applies for each detected cell associated with this MeasObject.

offsetMO

Offset values applicable to all measured cells with reference signal(s) indicated in this MeasObjectNR.

quantityConfigIndex

Indicates the n-th element of quantityConfigNR-List provided in MeasConfig.

referenceSignalConfig

RS configuration for SS/PBCH block and CSI-RS.

refFreqCSI-RS

Point A which is used for mapping of CSI-RS to physical resources according to TS 38.211 clause 7.4.1.5.3.

relaxedMeasurement

Configuration to allow relaxation of RRM measurement requirements for deactivated secondary cell groups (see TS 38.133 clauses 4.2.2.9 and 4.2.2.10, and TS 38.304 clause 5.2.4.9).

smtc1

Primary measurement timing configuration. (see clause 5.5.2.10).

smtc2

Secondary measurement timing configuration for SS corresponding to this MeasObjectNR with PCI listed in pci-List. For these SS, the periodicity is indicated by periodicity in smtc2 and the timing offset is equal to the offset indicated in periodicityAndOffset modulo periodicity. periodicity in smtc2 can only be set to a value strictly shorter than the periodicity indicated by periodicityAndOffset in smtc1 (e.g. if periodicityAndOffset indicates sf10, periodicity can only be set of sf5, if periodicityAndOffset indicates sf5, smtc2 cannot be configured).

smtc3list

Measurement timing configuration list for SS corresponding to IAB-MT. This is used for the IAB-node's discovery of other IAB-nodes and the IAB-Donor-DUs.

ssbFrequency

Indicates the frequency of the SS associated to this MeasObjectNR. For operation with shared spectrum channel access, this field is a k*30 kHz shift from the sync raster where k=0, 1, 2, and so on if the reportType within the corresponding ReportConfigNR is set to reportCGI (see TS 38.211 [16], clause 7.4.3.1). Frequencies are considered to be on the sync raster if they are also identifiable with a GSCN value (see TS 38.101-1 [15]).

ssb-PositionQCL-Common

Indicates the QCL relationship between SS/PBCH blocks for all measured cells as specified in TS 38.213 [13], clause 4.1.

ssbSubcarrierSpacing

Subcarrier spacing of SSB. Only the values 15 kHz or 30 kHz (FR1), and 120 kHz or 240 kHz (FR2) are applicable.

s-SearchDeltaP

Parameter "$S_{SearchDeltaP}$" in TS 38.304 [20]. Value dB3 corresponds to 3 dB, dB6 corresponds to 6 dB and so on.

s-SearchThresholdP

Parameter "$S_{SearchThresholdP}$" in TS 38.304 [20]. The network configures s-SearchThresholdP to be less than or equal to s-IntraSearchP and s-NonIntraSearchP.

s-SearchThresholdQ

Parameter "$S_{SearchThresholdQ}$" in TS 38.304 [20]. The network configures s-SearchThresholdQ to be less than or equal to s-IntraSearchQ and s-NonIntraSearchQ.

t-SearchDeltaP

Parameter "$T_{SearchDeltaP}$" in TS 38.304 [20]. Value in seconds. Value s5 means 5 seconds, value s10 means 10 seconds and so on.

whiteCellsToAddModList

List of cells to add/modify in the white list of cells. It applies only to SSB resources.

whiteCellsToRemoveList

List of cells to remove from the white list of cells.

RMTC-Config Field Descriptions measDurationSymbols

Number of consecutive symbols for which the Physical Layer reports samples of RSSI (see TS 38.215 [9], clause 5.1.21). Value sym1 corresponds to one symbol, sym14or12 corresponds to 14 symbols of the reference numerology for NCP and 12 symbols for ECP, and so on.

ref-SCS-CP

Indicates a reference subcarrier spacing and cyclic prefix to be used for RSSI measurements (see TS 38.215 [9]). Value kHz15 corresponds to 15 kHz, kHz30 corresponds to 30 kHz, value kHz60-NCP corresponds to 60 kHz using normal cyclic prefix (NCP), and kHz60-ECP corresponds to 60 kHz using extended cyclic prefix (ECP).

rmtc-Frequency

Indicates the center frequency of the measured bandwidth (see TS 38.215 [9], clause 5.1.21).

rmtc-Periodicity

Indicates the RSSI measurement timing configuration (RMTC) periodicity (see TS 38.215 [9], clause 5.1.21).

rmtc-SubframeOffset

Indicates the RSSI measurement timing configuration (RMTC) subframe offset for this frequency (see TS 38.215 [9], clause 5.1.21). For inter-frequency measurements, this field is optional present and if it is not configured, the UE chooses a random value as rmtc-Subframe Offset for measDurationSymbols which shall be selected to be between 0 and the configured fmtc-Periodicity with equal probability.

ReferenceSignalConfig Field Descriptions csi-rs-ResourceConfigMobility
  CSI-RS resources to be used for CSI-RS based RRM measurements.
ssb-ConfigMobility
  SSB configuration for mobility (nominal SSBs, timing configuration).

SSB-ConfigMobility Field Descriptions derive SSB-IndexFromCell
  If this field is set to true, UE assumes SFN and frame boundary alignment across cells on the same frequency carrier as specified in TS 38.133 [14]. Hence, if the UE is configured with a serving cell for which (absoluteFrequencySSB, subcarrierSpacing) in ServingCellConfigCommon is equal to (ssbFrequency, ssbSubcarrierSpacing) in this MeasObjectNR, this field indicates whether the UE can utilize the timing of this serving cell to derive the index of SS block transmitted by neighbour cell. Otherwise, this field indicates whether the UE may use the timing of any detected cell on that target frequency to derive the SSB index of all neighbour cells on that frequency.

ssb-ToMeasure
  The set of SS blocks to be measured within the SMTC measurement duration. The first/leftmost bit corresponds to SS/PBCH block index 0, the second bit corresponds to SS/PBCH block index 1, and so on. Value 0 in the bitmap indicates that the corresponding SS/PBCH block is not to be measured while value 1 indicates that the corresponding SS/PBCH block is to be measured (see TS 38.215 [9]). When the field is not configured the UE measures on all SS blocks. Regardless of the value of this field, SS/PBCH blocks outside of the applicable smtc are not to be measured. See TS 38.215 [9] clause 5.1.1.

SSB-PositionQCL-CellsToAddMod Field Descriptions physCellId
  Physical cell identity of a cell in the cell list.
ssb-PositionQCL
  Indicates the QCL relation between SS/PBCH blocks for a specific cell as specified in TS 38.213 [13], clause 4.1. If provided, the cell specific value overwrites the value signalled by ssb-PositionQCL-Common.

| Conditional Presence | Explanation |
| --- | --- |
| CSI-RS | This field is mandatory present if csi-rs-ResourceConfigMobility is configured, otherwise, it is absent. |
| SSBorAssociatedSSB | This field is mandatory present if ssb-ConfigMobility is configured or associatedSSB is configured in at least one cell. Otherwise, it is absent, Need R. |
| IntraFreqConnected | This field is optionally present, Need R if the UE is configured with a serving cell for which (absoluteFrequencySSB, subcarrierSpacing) in ServingCellConfigCommon is equal to (ssbFrequency, ssbSubcarrierSpacing) in this MeasObjectNR, otherwise, it is absent. |
| SharedSpectrum | This field is mandatory present if this MeasObject is for a frequency which operates with shared spectrum channel access. Otherwise, it is absent, Need R. |

Solution 2

According to some aspects, the RRC configuration of the CSG contains radio measurement configurations to be performed by the UE when the SCG is deactivated.

According to some aspects, the network configures long measurement cycles for deactivated SCG in the same RRC reconfiguration message where the SCG is configured.

The measurement configuration information elements may be extended to include radio resource management measurement relaxation indication and parameters. According to some aspects, the criteria for measurement relaxation is to trigger relaxed measurements only in a deactivated SCG. In that way, relaxed radio resource management measurement may be configured and used by the UE for deactivated SCGs.

MeasObjectNR
  The IE MeasObjectNR specifies information applicable for SS/PBCH block(s) intra/inter-frequency measurements and/or CSI-RS intra/inter-frequency measurements.

```
MeasObjectNR information element
-- ASN1START
-- TAG-MEASOBJECTNR-START
MeasObjectNR ::=                        SEQUENCE {
    ssbFrequency                            ARFCN-ValueNR
    OPTIONAL,       -- Cond SSBorAssociatedSSB
    ssbSubcarrierSpacing                    SubcarrierSpacing
```

```
    smtc1                           SSB-MTC
        OPTIONAL,       -- Cond SSBorAssociatedSSB
    smtc2                           SSB-MTC2
        OPTIONAL,       -- Cond IntraFreqConnected
    refFreqCSI-RS                   ARFCN-ValueNR
        OPTIONAL,       -- Cond CSI-RS
    referenceSignalConfig           ReferenceSignalConfig,
    absThreshSS-BlocksConsolidation ThresholdNR
        OPTIONAL,       -- Need R
    absThreshCSI-RS-Consolidation   ThresholdNR
        OPTIONAL,       -- Need R
    nrofSS-BlocksToAverage          INTEGER (2..maxNrofSS-BlocksToAverage)
        OPTIONAL,       -- Need R
    nrofCSI-RS-ResourcesToAverage   INTEGER (2..maxNrofCSI-RS-ResourcesToAverage)
        OPTIONAL,       -- Need R
    quantityConfigIndex             INTEGER (1..maxNrofQuantityConfig),
    offsetMO                        Q-OffsetRangeList,
    cellsToRemoveList               PCI-List
        OPTIONAL,       -- Need N
    cellsToAddModList               CellsToAddModList
        OPTIONAL,       -- Need N
    blackCellsToRemoveList          PCI-RangeIndexList
        OPTIONAL,       -- Need N
    blackCellsToAddModList          SEQUENCE (SIZE (1..maxNrofPCI-Ranges)) OF PCI-
RangeElement        OPTIONAL,       -- Need N
    whiteCellsToRemoveList          PCI-RangeIndexList
        OPTIONAL,       -- Need N
    whiteCellsToAddModList          SEQUENCE (SIZE (1..maxNrofPCI-Ranges)) OF PCI-
RangeElement        OPTIONAL,       -- Need N
    ...,
    [[
    freqBandIndicatorNR             FreqBandIndicatorNR
        OPTIONAL,       -- Need R
    measCycleSCell                  ENUMERATED {sf160, sf256, sf320, sf512, sf640, sf1024,
sf1280}             OPTIONAL,       -- Need R
    ]],
    [[
    smtc3list-r16                   SSB-MTC3List-r16
        OPTIONAL,       -- Need R
    rmtc-Config-r16                 SetupRelease {RMTC-Config-r16}
        OPTIONAL,       -- Need M
    t312-r16                        SetupRelease { T312-r16 }
        OPTIONAL            -- Need M
    ]]
    [[
    relaxedMeasurement-r17          SEQUENCE {
        lowMobilityEvaluation-r17       SEQUENCE {
            s-SearchDeltaP-r17              ENUMERATED {
                                                dB3, dB6, dB9, dB12, dB15,
                                                spare3, spare2, spare1},
            t-SearchDeltaP-r17              ENUMERATED {
                                                s5, s10, s20, s30, s60, s120, s180,
                                                s240, s300, spare7, spare6, spare5,
                                                spare4, spare3, spare2, spare1}
        }
        OPTIONAL,       -- Need R
        cellEdgeEvaluation-r17          SEQUENCE {
            s-SearchThresholdP-r17          ReselectionThreshold,
            s-SearchThresholdQ-r17          ReselectionThresholdQ
        OPTIONAL            -- Need R
        }
        OPTIONAL,       -- Need R
        combineRelaxedMeasCondition-r17 ENUMERATED {true}
        OPTIONAL,       -- Need R
        highPriorityMeasRelax-r17       ENUMERATED {true}
        OPTIONAL            -- Need R
    }
        OPTIONAL            -- Need R
    ]]
}
SSB-MTC3List-r16::=                 SEQUENCE (SIZE(1..4)) OF SSB-MTC3-r16
T312-r16 ::=                        ENUMERATED { ms0, ms50, ms100, ms200, ms300, ms400, ms500,
ms1000}
```

```
ReferenceSignalConfig::=                    SEQUENCE {
    ssb-ConfigMobility                          SSB-ConfigMobility
OPTIONAL,           -- Need M
    csi-rs-ResourceConfigMobility               SetupRelease { CSI-RS-ResourceConfigMobility }
OPTIONAL,           -- Need M
}
SSB-ConfigMobility::=                       SEQUENCE {
    ssb-ToMeasure                               SetupRelease { SSB-ToMeasure }
OPTIONAL,           -- Need M
    deriveSSB-IndexFromCell                     BOOLEAN,
    ss-RSSI-Measurement                         SS-RSSI-Measurement
OPTIONAL,           -- Need M
    ...,
    [[
    ssb-PositionQCL-Common-r16                  SSB-PositionQCL-Relation-r16
OPTIONAL,           -- Cond SharedSpectrum
    ssb-PositionQCL-CellsToAddModList-r16       SSB-PositionQCL-CellsToAddModList-r16
OPTIONAL,           -- Need N
    ssb-PositionQCL-CellsToRemoveList-r16       PCI-List
OPTIONAL            -- Need N
    ]]
}
Q-OffsetRangeList ::=                       SEQUENCE {
    rsrpOffsetSSB                               Q-OffsetRange           DEFAULT dB0,
    rsrqOffsetSSB                               Q-OffsetRange           DEFAULT dB0,
    sinrOffsetSSB                               Q-OffsetRange           DEFAULT dB0,
    rsrpOffsetCSI-RS                            Q-OffsetRange           DEFAULT dB0,
    rsrqOffsetCSI-RS                            Q-OffsetRange           DEFAULT dB0,
    sinrOffsetCSI-RS                            Q-OffsetRange           DEFAULT dB0,
}
ThresholdNR ::=                             SEQUENCE {
    thresholdRSRP                               RSRP-Range
OPTIONAL,           -- Need R
    thresholdRSRQ                               RSRQ-Range
OPTIONAL,           -- Need R
    thresholdSINR                               SINR-Range
OPTIONAL            -- Need R
}
CellsToAddModList ::=                       SEQUENCE (SIZE (1..maxNrofCellMeas)) OF CellsToAddMod
CellsToAddMod ::=                           SEQUENCE {
    physCellId                                  PhysCellId,
    cellIndividualOffset                        Q-OffsetRangeList
}
RMTC-Config-r16 ::=                         SEQUENCE {
    rmtc-Periodicity-r16                        ENUMERATED {ms40, ms80, ms160, ms320, ms640},
    rmtc-SubframeOffset-r16                     INTEGER (0..639)
OPTIONAL,           -- Need M
    measDurationSymbols-r16                     ENUMERATED {sym1, sym14or12, sym28or24, sym42or36,
sym70or60},
    rmtc-Frequency-r16                          ARFCN-ValueNR,
    ref-SCS-CP-r16                              ENUMERATED {kHz15, kHz30, kHz60-NCP, kHz60-ECP},
    ...
}
SSB-PositionQCL-CellsToAddModList-r16 ::=   SEQUENCE (SIZE (1..maxNrofCellMeas)) OF SSB-
PositionQCL-CellsToAddMod-r16
SSB-PositionQCL-CellsToAddMod-r16 ::=       SEQUENCE {
    physCellId-r16                              PhysCellId,
    ssb-PositionQCL-r16                         SSB-PositionQCL-Relation-r16
}
-- TAG-MEASOBJECTNR-STOP
-- ASN1STOP
```

CellsToAddMod Field Descriptions cellIndividualOffset
 Cell individual offsets applicable to a specific cell.
physCellId
 Physical cell identity of a cell in the cell list.

MeasObjectNR Field Descriptions absThreshCSI-RS-Consolidation
 Absolute threshold for the consolidation of measurement results per CSI-RS resource(s) from L1 filter(s). The field is used for the derivation of cell measurement results as described in 5.5.3.3 and the reporting of beam measurement information per CSI-RS resource as described in 5.5.5.2.
absThreshSS-BlocksConsolidation
 Absolute threshold for the consolidation of measurement results per SS/PBCH block(s) from L1 filter(s). The field is used for the derivation of cell measurement results as described in 5.5.3.3 and the reporting of beam measurement information per SS/PBCH block index as described in 5.5.5.2.
blackCellsToAddModList
 List of cells to add/modify in the black list of cells. It applies only to SSB resources.
blackCellsToRemoveList
 List of cells to remove from the black list of cells.

cellEdgeEvaluation
   Indicates the criteria for a UE to detect that it is not at cell edge, in order to relax measurement requirements (see TS 38.304 [20], clause 5.2.4.9.2).
cellsToAddModList
   List of cells to add/modify in the cell list.
cellsToRemoveList
   List of cells to remove from the cell list.
combineRelaxedMeasCondition
   When both lowMobilityEvalutation and cellEdgeEvaluation criteria are present in SIB2, this parameter configures the UE to fulfil both criteria in order to relax measurement requirements. If the field is absent, the UE is allowed to relax measurement requirements for cell reselection when either or both of the criteria are met. (Sec TS 38.304 [20], clause 5.2.4.9.0)
freqBandIndicatorNR
   The frequency band in which the SSB and/or CSI-RS indicated in this MeasObjectNR are located and according to which the UE shall perform the RRM measurements. This field is always provided when the network configures measurements with this MeasObjectNR.
highPriorityMeasRelax
   Indicates whether measurements can be relaxed on high priority frequencies (see TS 38.304 [20], clause 5.2.4.9.0). If the field is absent, the UE shall not relax measurements on high priority frequencies beyond "$T_{higher\_priority\_search}$" (see TS 38.133 [14], clause 4.2.2.7).
lowMobilityEvaluation
   Indicates the criteria for a UE to detect low mobility, in order to relax measurement requirements (see TS 38.304 [20], clause 5.2.4.9.1).
measCycleSCell
   The parameter is used only when an SCell is configured on the frequency indicated by the measObjectNR and is in deactivated state, sec TS 38.133 [14]. gNB configures the parameter whenever an SCell is configured on the frequency indicated by the measObjectNR, but the field may also be signalled when an SCell is not configured. Value sf160 corresponds to 160 sub-frames, value sf256 corresponds to 256 sub-frames and so on.
nrofCSInrofCSI-RS-ResourcesToAverage
   Indicates the maximum number of measurement results per beam based on CSI-RS resources to be averaged. The same value applies for each detected cell associated with this MeasObjectNR.
nrofSS-BlocksToAverage
   Indicates the maximum number of measurement results per beam based on SS/PBCH blocks to be averaged. The same value applies for each detected cell associated with this MeasObject.
offsetMO
   Offset values applicable to all measured cells with reference signal(s) indicated in this MeasObjectNR.
quantityConfigIndex
   Indicates the n-th element of quantityConfigNR-List provided in MeasConfig.
referenceSignalConfig
   RS configuration for SS/PBCH block and CSI-RS.
refFreqCSI-RS
   Point A which is used for mapping of CSI-RS to physical resources according to TS 38.211 clause 7.4.1.5.3.
relaxedMeasurement
   Configuration to allow relaxation of RRM measurement requirements for deactivated secondary cell groups (see TS 38.133 clauses 4.2.2.9 and 4.2.2.10, and TS 38.304 clause 5.2.4.9). The parameter is used only when an SCell is in deactivated state.
smtc1
   Primary measurement timing configuration. (see clause 5.5.2.10).
smtc2
   Secondary measurement timing configuration for SS corresponding to this MeasObjectNR with PCI listed in pci-List. For these SS, the periodicity is indicated by periodicity in smtc2 and the timing offset is equal to the offset indicated in periodicityAndOffset modulo periodicity. periodicity in smtc2 can only be set to a value strictly shorter than the periodicity indicated by periodicityAndOffset in smtc1 (e.g. if periodicityAndOffset indicates sf10, periodicity can only be set of sf5, if periodicityAndOffset indicates sf5, smtc2 cannot be configured).
smtc3list
   Measurement timing configuration list for SS corresponding to IAB-MT. This is used for the IAB-node's discovery of other IAB-nodes and the IAB-Donor-DUs.
ssb Frequency
   Indicates the frequency of the SS associated to this MeasObjectNR. For operation with shared spectrum channel access, this field is a k*30 kHz shift from the sync raster where k=0, 1, 2, and so on if the reportType within the corresponding ReportConfigNR is set to reportCGI (see TS 38.211 [16], clause 7.4.3.1). Frequencies are considered to be on the sync raster if they are also identifiable with a GSCN value (see TS 38.101-1 [15]).
ssb-PositionQCL-Common
   Indicates the QCL relationship between SS/PBCH blocks for all measured cells as specified in TS 38.213 [13], clause 4.1.
ssbSubcarrierSpacing
   Subcarrier spacing of SSB. Only the values 15 kHz or 30 kHz (FR1), and 120 kHz or 240 kHz (FR2) are applicable.
s-SearchDeltaP
   Parameter "$S_{SearchDeltaP}$" in TS 38.304 [20]. Value dB3 corresponds to 3 dB, dB6 corresponds to 6 dB and so on.
s-SearchThresholdP
   Parameter "$S_{SearchThresholdP}$" in TS 38.304 [20]. The network configures s-SearchThresholdP to be less than or equal to s-IntraSearchP and s-NonIntraSearchP.
s-SearchThresholdQ
   Parameter "$S_{SearchThresholdQ}$" in TS 38.304 [20]. The network configures s-SearchThresholdQ to be less than or equal to s-IntraSearchQ and s-NonIntraSearchQ.
t-SearchDeltaP
   Parameter "$T_{SearchDeltaP}$" in TS 38.304 [20]. Value in seconds. Value s5 means 5 seconds, value s10 means 10 seconds and so on.
whiteCellsToAddModList
   List of cells to add/modify in the white list of cells. It applies only to SSB resources.
whiteCellsToRemoveList
   List of cells to remove from the white list of cells.

RMTC-Config Field Descriptions measDurationSymbols
   Number of consecutive symbols for which the Physical Layer reports samples of RSSI (see TS 38.215 [9], clause 5.1.21). Value sym1 corresponds to one symbol, sym14or12 corresponds to 14 symbols of the reference numerology for NCP and 12 symbols for ECP, and so on.

ref-SCS-CP
  Indicates a reference subcarrier spacing and cyclic prefix to be used for RSSI measurements (see TS 38.215 [9]). Value kHz15 corresponds to 15 kHz, kHz30 corresponds to 30 kHz, value kHz60-NCP corresponds to 60 kHz using normal cyclic prefix (NCP), and kHz60-ECP corresponds to 60 kHz using extended cyclic prefix (ECP).
rmtc-Frequency
  Indicates the center frequency of the measured bandwidth (see TS 38.215 [9], clause 5.1.21).
rmtc-Periodicity
  Indicates the RSSI measurement timing configuration (RMTC) periodicity (see TS 38.215 [9], clause 5.1.21).
rmtc-SubframeOffset
  Indicates the RSSI measurement timing configuration (RMTC) subframe offset for this frequency (see TS 38.215 [9], clause 5.1.21). For inter-frequency measurements, this field is optional present and if it is not configured, the UE chooses a random value as rmtc-Subframe Offset for meas-DurationSymbols which shall be selected to be between 0 and the configured rmtc-Periodicity with equal probability.

ReferenceSignalConfig Field Descriptions csi-rs-ResourceConfigMobility
  CSI-RS resources to be used for CSI-RS based RRM measurements.

ssb-ToMeasure
  The set of SS blocks to be measured within the SMTC measurement duration. The first/leftmost bit corresponds to SS/PBCH block index 0, the second bit corresponds to SS/PBCH block index 1, and so on. Value 0 in the bitmap indicates that the corresponding SS/PBCH block is not to be measured while value 1 indicates that the corresponding SS/PBCH block is to be measured (see TS 38.215 [9]). When the field is not configured the UE measures on all SS blocks. Regardless of the value of this field, SS/PBCH blocks outside of the applicable smtc are not to be measured. See TS 38.215 [9] clause 5.1.1.

SSB-PositionQCL-CellsToAddMod Field Descriptions physCellId
  Physical cell identity of a cell in the cell list.
ssb-PositionQCL
  Indicates the QCL relation between SS/PBCH blocks for a specific cell as specified in TS 38.213 [13], clause 4.1. If provided, the cell specific value overwrites the value signalled by ssb-PositionQCL-Common.

| Conditional Presence | Explanation |
|---|---|
| CSI-RS | This field is mandatory present if csi-rs-ResourceConfigMobility is configured, otherwise, it is absent. |
| SSBorAssociatedSSB | This field is mandatory present if ssb-ConfigMobility is configured or associatedSSB is configured in at least one cell. Otherwise, it is absent, Need R. |
| IntraFreqConnected | This field is optionally present, Need R if the UE is configured with a serving cell for which (absoluteFrequencySSB, subcarrierSpacing) in ServingCellConfigCommon is equal to (ssbFrequency, ssbSubcarrierSpacing) in this MeasObjectNR, otherwise, it is absent. |
| SharedSpectrum | This field is mandatory present if this MeasObject is for a frequency which operates with shared spectrum channel access. Otherwise, it is absent, Need R. | ssb-ConfigMobility
  SSB configuration for mobility (nominal SSBs, timing configuration).

SSB-ConfigMobility Field Descriptions deriveSSB-IndexFromCell
  If this field is set to true, UE assumes SFN and frame boundary alignment across cells on the same frequency carrier as specified in TS 38.133 [14]. Hence, if the UE is configured with a serving cell for which (absoluteFrequencySSB, subcarrierSpacing) in ServingCellConfigCommon is equal to (ssbFrequency, ssbSubcarrierSpacing) in this MeasObjectNR, this field indicates whether the UE can utilize the timing of this serving cell to derive the index of SS block transmitted by neighbour cell. Otherwise, this field indicates whether the UE may use the timing of any detected cell on that target frequency to derive the SSB index of all neighbour cells on that frequency.

Solution 3

According to some aspects, the UE performs measurements in a deactivated SCG based on a new RRC configuration message which is either dedicated to SCG reconfiguration or where the RRM measurements are relaxed in the following manner:
  The measurement configuration information elements may be extended to include radio resource management measurement relaxation indication and parameters. The measurement relaxation is triggered upon the reception of the measurement configuration extension when CSG is already deactivated. In that way, relaxed radio resource management measurement can be configured and used by the UE for deactivated SCGs.
MeasObjectNR
  The IE MeasObjectNR specifies information applicable for SS/PBCH block(s) intra/inter-frequency measurements and/or CSI-RS intra/inter-frequency measurements.

MeasObjectNR information element
-- ASN1START
-- TAG-MEASOBJECTNR-START

```
MeasObjectNR ::=                          SEQUENCE {
    ssbFrequency                              ARFCN-ValueNR
OPTIONAL,         -- Cond SSBorAssociatedSSB
    ssbSubcarrierSpacing                      SubcarrierSpacing
OPTIONAL,         -- Cond SSBorAssociatedSSB
    smtc1                                     SSB-MTC
OPTIONAL,         -- Cond SSBorAssociatedSSB
    smtc2                                     SSB-MTC2
OPTIONAL,         -- Cond IntraFreqConnected
    refFreqCSI-RS                             ARFCN-ValueNR
OPTIONAL,         -- Cond CSI-RS
    referenceSignalConfig                     ReferenceSignalConfig,
    absThreshSS-BlocksConsolidation           ThresholdNR
OPTIONAL,         -- Need R
    absThreshCSI-RS-Consolidation             ThresholdNR
OPTIONAL,         -- Need R
    nrofSS-BlocksToAverage                    INTEGER (2..maxNrofSS-BlocksToAverage)
OPTIONAL,         -- Need R
    nrofCSI-RS-ResourcesToAverage             INTEGER (2..maxNrofCSI-RS-ResourcesToAverage)
OPTIONAL,         -- Need R
    quantityConfigIndex                       INTEGER (1..maxNrofQuantityConfig),
    offsetMO                                  Q-OffsetRangeList,
    cellsToRemoveList                         PCI-List
OPTIONAL,         -- Need N
    cellsToAddModList                         CellsToAddModList
OPTIONAL,         -- Need N
    blackCellsToRemoveList                    PCI-RangeIndexList
OPTIONAL,         -- Need N
    blackCellsToAddModList                    SEQUENCE (SIZE (1..maxNrofPCI-Ranges)) OF PCI-
RangeElement         OPTIONAL,    -- Need N
    whiteCellsToRemoveList                    PCI-RangeIndexList
OPTIONAL,         -- Need N
    whiteCellsToAddModList                    SEQUENCE (SIZE (1..maxNrofPCI-Ranges)) OF PCI-
RangeElement         OPTIONAL,    -- Need N
    ...,
    [[
    freqBandIndicatorNR                       FreqBandIndicatorNR
OPTIONAL,         -- Need R
    measCycleSCell                            ENUMERATED {sf160, sf256, sf320, sf512, sf640, sf1024,
sf1280}              OPTIONAL,    -- Need R
    ]],
    [[
    smtc3list-r16                             SSB-MTC3List-r16
OPTIONAL,         -- Need R
    rmtc-Config-r16                           SetupRelease {RMTC-Config-r16}
OPTIONAL,         -- Need M
    t312-r16                                  SetupRelease { T312-r16 }
OPTIONAL             -- Need M
    ]]
    [[
    relaxedMeasurement-r17                    SEQUENCE {
        lowMobilityEvaluation-r17                 SEQUENCE {
            s-SearchDeltaP-r17                        ENUMERATED {
                                                          dB3, dB6, dB9, dB12, dB15,
                                                          spare3, spare2, spare1},
            t-SearchDeltaP-r17                        ENUMERATED {
                                                          s5, s10, s20, s30, s60, s120, s180,
                                                          s240, s300, spare7, spare6, spare5,
                                                          spare4, spare3, spare2, spare1}
        }
OPTIONAL,         -- Need R
        cellEdgeEvaluation-r17                    SEQUENCE {
            s-SearchThresholdP-r17                    ReselectionThreshold,
            s-SearchThresholdQ-r17                    ReselectionThresholdQ
OPTIONAL             -- Need R
        }
OPTIONAL,         -- Need R
        combineRelaxedMeasCondition-r17           ENUMERATED {true}
OPTIONAL,         -- Need R
        highPriorityMeasRelax-r17                 ENUMERATED {true}
OPTIONAL             -- Need R
    }
OPTIONAL             -- Need R
    ]]
}
SSB-MTC3List-r16::=                       SEQUENCE (SIZE(1..4)) OF SSB-MTC3-r16
T312-r16 ::=                              ENUMERATED { ms0, ms50, ms100, ms200, ms300, ms400, ms500,
ms1000}
```

-continued

```
ReferenceSignalConfig::=            SEQUENCE {
   ssb-ConfigMobility                  SSB-ConfigMobility
OPTIONAL,         -- Need M
   csi-rs-ResourceConfigMobility       SetupRelease { CSI-RS-ResourceConfigMobility }
OPTIONAL,         -- Need M
}
SSB-ConfigMobility::=               SEQUENCE {
   ssb-ToMeasure                       SetupRelease { SSB-ToMeasure }
OPTIONAL,         -- Need M
   deriveSSB-IndexFromCell             BOOLEAN,
   ss-RSSI-Measurement                 SS-RSSI-Measurement
OPTIONAL,         -- Need M
   ...,
   [[
   ssb-PositionQCL-Common-r16          SSB-PositionQCL-Relation-r16
OPTIONAL,         -- Cond SharedSpectrum
   ssb-PositionQCL-CellsToAddModList-r16   SSB-PositionQCL-CellsToAddModList-r16
OPTIONAL,         -- Need N
   ssb-PositionQCL-CellsToRemoveList-r16   PCI-List
OPTIONAL          -- Need N
   ]]
}
Q-OffsetRangeList ::=               SEQUENCE {
   rsrpOffsetSSB                       Q-OffsetRange           DEFAULT dB0,
   rsrqOffsetSSB                       Q-OffsetRange           DEFAULT dB0,
   sinrOffsetSSB                       Q-OffsetRange           DEFAULT dB0,
   rsrpOffsetCSI-RS                    Q-OffsetRange           DEFAULT dB0,
   rsrqOffsetCSI-RS                    Q-OffsetRange           DEFAULT dB0,
   sinrOffsetCSI-RS                    Q-OffsetRange           DEFAULT dB0,
}
ThresholdNR ::=                     SEQUENCE {
   thresholdRSRP                       RSRP-Range
OPTIONAL,         -- Need R
   thresholdRSRQ                       RSRQ-Range
OPTIONAL,         -- Need R
   thresholdSINR                       SINR-Range
OPTIONAL          -- Need R
}
CellsToAddModList ::=               SEQUENCE (SIZE (1..maxNrofCellMeas)) OF CellsToAddMod
CellsToAddMod ::=                   SEQUENCE {
   physCellId                          PhysCellId,
   cellIndividualOffset                Q-OffsetRangeList
}
RMTC-Config-r16 ::=                 SEQUENCE {
   rmtc-Periodicity-r16                ENUMERATED {ms40, ms80, ms160, ms320, ms640},
   rmtc-SubframeOffset-r16             INTEGER (0..639)
OPTIONAL,         -- Need M
   measDurationSymbols-r16             ENUMERATED {sym1, sym14or12, sym28or24, sym42or36,
sym70or60},
   rmtc-Frequency-r16                  ARFCN-ValueNR,
   ref-SCS-CP-r16                      ENUMERATED {kHz15, kHz30, kHz60-NCP, kHz60-ECP},
   ...
}
SSB-PositionQCL-CellsToAddModList-r16 ::=   SEQUENCE (SIZE (1..maxNrofCellMeas)) OF SSB-
PositionQCL-CellsToAddMod-r16
SSB-PositionQCL-CellsToAddMod-r16 ::=   SEQUENCE {
   physCellId-r16                      PhysCellId,
   ssb-PositionQCL-r16                 SSB-PositionQCL-Relation-r16
}
-- TAG-MEASOBJECTNR-STOP
-- ASN1STOP
```

CellsToAddMod Field Descriptions cellIndividualOffset
Cell individual offsets applicable to a specific cell.
physCellId
Physical cell identity of a cell in the cell list.

MeasObjectNR Field Descriptions absThreshCSI-RS-Consolidation
Absolute threshold for the consolidation of measurement results per CSI-RS resource(s) from L1 filter(s). The field is used for the derivation of cell measurement results as described in 5.5.3.3 and the reporting of beam measurement information per CSI-RS resource as described in 5.5.5.2.
absThreshSS-BlocksConsolidation
Absolute threshold for the consolidation of measurement results per SS/PBCH block(s) from L1 filter(s). The field is used for the derivation of cell measurement results as described in 5.5.3.3 and the reporting of beam measurement information per SS/PBCH block index as described in 5.5.5.2.
blackCellsToAddModList
List of cells to add/modify in the black list of cells. It applies only to SSB resources.
blackCellsToRemoveList
List of cells to remove from the black list of cells.

cellEdgeEvaluation
    Indicates the criteria for a UE to detect that it is not at cell edge, in order to relax measurement requirements (see TS 38.304 [20], clause 5.2.4.9.2).
cellsToAddModList
    List of cells to add/modify in the cell list.
cellsToRemoveList
    List of cells to remove from the cell list.
combineRelaxedMeasCondition
    When both lowMobilityEvaluation and cellEdgeEvaluation criteria are present in SIB2, this parameter configures the UE to fulfil both criteria in order to relax measurement requirements. If the field is absent, the UE is allowed to relax measurement requirements for cell reselection when either or both of the criteria are met. (Sec TS 38.304 [20], clause 5.2.4.9.0)
freqBandIndicatorNR
    The frequency band in which the SSB and/or CSI-RS indicated in this MeasObjectNR are located and according to which the UE shall perform the RRM measurements. This field is always provided when the network configures measurements with this MeasObjectNR.
highPriorityMeasRelax
    Indicates whether measurements can be relaxed on high priority frequencies (see TS 38.304 [20], clause 5.2.4.9.0). If the field is absent, the UE shall not relax measurements on high priority frequencies beyond "$T_{higher\_priority\_search}$" (see TS 38.133 [14], clause 4.2.2.7).
Low Mobility Evaluation
    Indicates the criteria for a UE to detect low mobility, in order to relax measurement requirements (see TS 38.304 [20], clause 5.2.4.9.1).
measCycleSCell
    The parameter is used only when an SCell is configured on the frequency indicated by the measObjectNR and is in deactivated state, sec TS 38.133 [14]. gNB configures the parameter whenever an SCell is configured on the frequency indicated by the measObjectNR, but the field may also be signalled when an SCell is not configured. Value sf160 corresponds to 160 sub-frames, value sf256 corresponds to 256 sub-frames and so on.
nrofCSInrofCSI-RS-ResourcesToAverage
    Indicates the maximum number of measurement results per beam based on CSI-RS resources to be averaged. The same value applies for each detected cell associated with this MeasObjectNR.
nrofSS-BlocksToAverage
    Indicates the maximum number of measurement results per beam based on SS/PBCH blocks to be averaged. The same value applies for each detected cell associated with this MeasObject.
offsetMO
    Offset values applicable to all measured cells with reference signal(s) indicated in this MeasObjectNR.
quantityConfigIndex
    Indicates the n-th element of quantityConfigNR-List provided in MeasConfig.
referenceSignalConfig
    RS configuration for SS/PBCH block and CSI-RS.
refFreqCSI-RS
    Point A which is used for mapping of CSI-RS to physical resources according to TS 38.211 clause 7.4.1.5.3.
relaxedMeasurement
    Configuration to allow relaxation of RRM measurement requirements for deactivated secondary cell groups (see TS 38.133 clauses 4.2.2.9 and 4.2.2.10, and TS 38.304 clause 5.2.4.9).
smtc1
    Primary measurement timing configuration. (see clause 5.5.2.10).
smtc2
    Secondary measurement timing configuration for SS corresponding to this MeasObjectNR with PCI listed in pciList. For these SS, the periodicity is indicated by periodicity in smtc2 and the timing offset is equal to the offset indicated in periodicityAndOffset modulo periodicity. periodicity in smtc2 can only be set to a value strictly shorter than the periodicity indicated by periodicityAndOffset in smtc1 (e.g. if periodicityAndOffset indicates sf10, periodicity can only be set of sf5, if periodicityAndOffset indicates sf5, smtc2 cannot be configured).
smtc3list
    Measurement timing configuration list for SS corresponding to IAB-MT. This is used for the IAB-node's discovery of other IAB-nodes and the IAB-Donor-DUs.
ssbFrequency
    Indicates the frequency of the SS associated to this MeasObjectNR. For operation with shared spectrum channel access, this field is a k*30 kHz shift from the sync raster where k=0, 1, 2, and so on if the reportType within the corresponding ReportConfigNR is set to reportCGI (see TS 38.211 [16], clause 7.4.3.1). Frequencies are considered to be on the sync raster if they are also identifiable with a GSCN value (see TS 38.101-1 [15]).
ssb-PositionQCL-Common
    Indicates the QCL relationship between SS/PBCH blocks for all measured cells as specified in TS 38.213 [13], clause 4.1.
ssbSubcarrierSpacing
    Subcarrier spacing of SSB. Only the values 15 kHz or 30 kHz (FR1), and 120 kHz or 240 KHz (FR2) are applicable.
s-SearchDeltaP
    Parameter "$S_{SearchDeltaP}$" in TS 38.304 [20]. Value dB3 corresponds to 3 dB, dB6 corresponds to 6 dB and so on.
s-SearchThresholdP
    Parameter "$S_{SearchThresholdP}$" in TS 38.304 [20]. The network configures s-SearchThresholdP to be less than or equal to s-IntraSearchP and s-NonIntraSearchP.
s-SearchThresholdQ
    Parameter "$S_{SearchThresholdQ}$" in TS 38.304 [20]. The network configures s-SearchThresholdQ to be less than or equal to s-IntraSearchQ and s-NonIntraSearchQ.
t-SearchDeltaP
    Parameter "$T_{SearchDeltaP}$" in TS 38.304 [20]. Value in seconds. Value s5 means 5 seconds, value s10 means 10 seconds and so on.
whiteCellsToAddModList
    List of cells to add/modify in the white list of cells. It applies only to SSB resources.
whiteCellsToRemoveList
    List of cells to remove from the white list of cells.

RMTC-Config Field Descriptions measDurationSymbols
    Number of consecutive symbols for which the Physical Layer reports samples of RSSI (see TS 38.215 [9], clause 5.1.21). Value sym1 corresponds to one symbol, sym14or12 corresponds to 14 symbols of the reference numerology for NCP and 12 symbols for ECP, and so on.
ref-SCS-CP
    Indicates a reference subcarrier spacing and cyclic prefix to be used for RSSI measurements (see TS 38.215 [9]). Value kHz15 corresponds to 15 kHz, kHz30 corresponds to 30 kHz, value kHz60-NCP corresponds to 60 kHz using normal cyclic prefix (NCP), and kHz60-ECP corresponds to 60 kHz using extended cyclic prefix (ECP).
rmtc-Frequency
Indicates the center frequency of the measured bandwidth (see TS 38.215 [9], clause 5.1.21).
rmtc-Periodicity
Indicates the RSSI measurement timing configuration (RMTC) periodicity (see TS 38.215 [9], clause 5.1.21).
rmtc-SubframeOffset
Indicates the RSSI measurement timing configuration (RMTC) subframe offset for this frequency (see TS 38.215 [9], clause 5.1.21). For inter-frequency measurements, this field is optional present and if it is not configured, the UE chooses a random value as rmtc-Subframe Offset for measDurationSymbols which shall be selected to be between 0 and the configured rmtc-Periodicity with equal probability.

ReferenceSignalConfig Field Descriptions csi-rs-ResourceConfigMobility
CSI-RS resources to be used for CSI-RS based RRM measurements.
ssb-ConfigMobility
SSB configuration for mobility (nominal SSBs, timing configuration).

SSB-ConfigMobility Field Descriptions deriveSSB-IndexFromCell
If this field is set to true, UE assumes SFN and frame boundary alignment across cells on the same frequency carrier as specified in TS 38.133 [14]. Hence, if the UE is configured with a serving cell for which (absoluteFrequencySSB, subcarrierSpacing) in ServingCellConfigCommon is equal to (ssbFrequency, ssbSubcarrierSpacing) in this MeasObjectNR, this field indicates whether the UE can utilize the timing of this serving cell to derive the index of SS block transmitted by neighbour cell. Otherwise, this field indicates whether the UE may use the timing of any detected cell on that target frequency to derive the SSB index of all neighbour cells on that frequency.
ssb-ToMeasure
The set of SS blocks to be measured within the SMTC measurement duration. The first/leftmost bit corresponds to SS/PBCH block index 0, the second bit corresponds to SS/PBCH block index 1, and so on. Value 0 in the bitmap indicates that the corresponding SS/PBCH block is not to be measured while value 1 indicates that the corresponding SS/PBCH block is to be measured (see TS 38.215 [9]). When the field is not configured the UE measures on all SS blocks. Regardless of the value of this field, SS/PBCH blocks outside of the applicable smtc are not to be measured. See TS 38.215 [9] clause 5.1.1.

SSB-PositionQCL-CellsToAddMod Field Descriptions physCellId
Physical cell identity of a cell in the cell list.
ssb-PositionQCL
Indicates the QCL relation between SS/PBCH blocks for a specific cell as specified in TS

| Conditional Presence | Explanation |
|---|---|
| CSI-RS | This field is mandatory present if csi-rs-ResourceConfigMobility is configured, otherwise, it is absent. |
| SSBorAssociatedSSB | This field is mandatory present if ssb-ConfigMobility is configured or associatedSSB is configured in at least one cell. Otherwise, it is absent, Need R. |
| IntraFreqConnected | This field is optionally present, Need R if the UE is configured with a serving cell for which (absoluteFrequencySSB, subcarrierSpacing) in ServingCellConfigCommon is equal to (ssbFrequency, ssbSubcarrierSpacing) in this MeasObjectNR, otherwise, it is absent. |
| SharedSpectrum | This field is mandatory present if this MeasObject is for a frequency which operates with shared spectrum channel access. Otherwise, it is absent, Need R. |

Example Communications System

The 3rd Generation Partnership Project (3GPP) develops technical standards for cellular telecommunications network technologies, including radio access, the core transport network, and service capabilities-including work on codecs, security, and quality of service. Recent radio access technology (RAT) standards include WCDMA (commonly referred as 3G), LTE (commonly referred as 4G), LTE-Advanced standards, and New Radio (NR), which may be also referred to as "5G". 3GPP NR standards development may be expected to continue and include the definition of next generation radio access technology (new RAT), which may be expected to include the provision of new flexible radio access below 7 GHZ, and the provision of new ultra-mobile broadband radio access above 7 GHz. The flexible radio access may be expected to consist of a new, non-backwards compatible radio access in new spectrum below 7 GHz, and it may be expected to include different operating modes that may be multiplexed together in the same spectrum to address a broad set of 3GPP NR use cases with diverging requirements. The ultra-mobile broadband may be expected to include cm Wave and mm Wave spectrum that may provide the opportunity for ultra-mobile broadband access for, e.g., indoor applications and hotspots. In particular, the ultra-mobile broadband may be expected to share a common design framework with the flexible radio access below 7 GHZ, with cmWave and mmWave specific design optimizations.

3GPP has identified a variety of use cases that NR may be expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 5A:
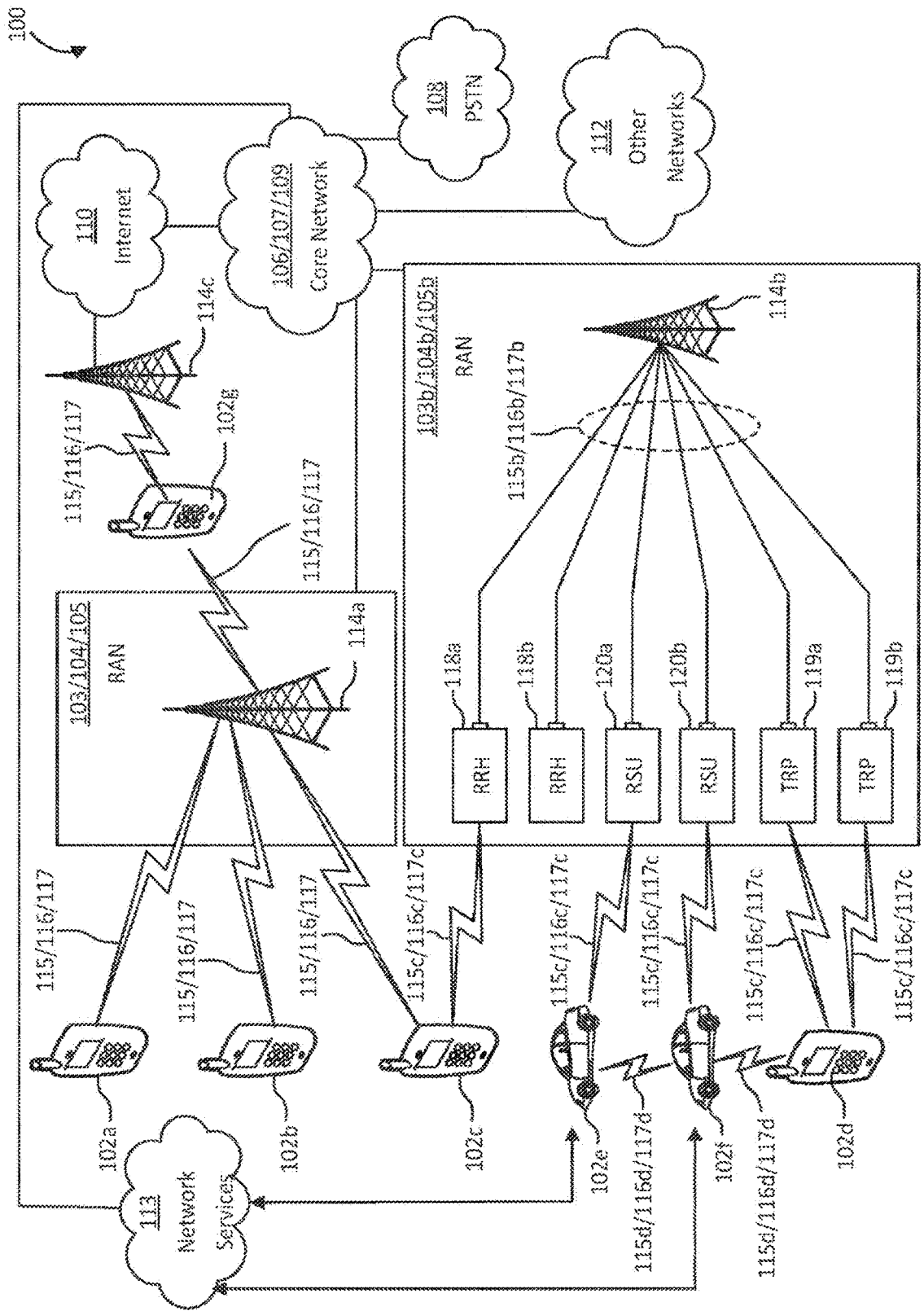
FIG. 5A illustrates an example communications system.

FIG. 5A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It may be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 5A, each of the WTRUs 102 may be depicted in FIGS. 8A-8E as a hand-held wireless communications apparatus. It may be understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 5A, each base stations 114a and 114b may be depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 115A, 115B, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 115A, 115B may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 115A and 115B, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 115A, 115B and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115*d*/116*d*/117*d* may be established using any suitable RAT.

The communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 115A, 115B and/or RSUs 120*a* and 120*b* in the RAN 103*b*/104*b*/105*b* and the WTRUs 102*c*, 102*d*, 102*e*, and 102*f*, may implement a radio technology such as Universal Mobile Telecommunications System (UMTS) Terrestrial Radio Access (UTRA), which may establish the air interface 115/116/117 and/or 115*c*/116*c*/117*c* respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114*a* in the RAN 103/104/105 and the WTRUs 102*a*, 102*b*, 102*c*, and 102*g*, or RRHs 118*a* and 118*b*, TRPs 115A and 115B, and/or RSUs 120*a* and 120*b* in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A), for example. The air interface 115/116/117 or 115*c*/116*c*/117*c* may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114*a* in the RAN 103/104/105 and the WTRUs 102*a*, 102*b*, 102*c*, and 102*g* or RRHs 118*a* and 118*b*, TRPs 115A and 115B, and/or RSUs 120*a* and 120*b* in the RAN 103*b*/104*b*/105*b* and the WTRUs 102*c*, 102*d*, 102*e*, and 102*f* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 5A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114*c* and the WTRUs 102, e.g., WTRU 102*e*, may implement a radio technology such as IEEE 802.11 to establish a Wireless Local Area Network (WLAN). Similarly, the base station 114*c* and the WTRUs 102, e.g., WTRU 102*d*, may implement a radio technology such as IEEE 802.15 to establish a wireless personal area network (WPAN). The base station 114*c* and the WTRUs 102, e.g., WRTU 102*e*, may utilize a cellular-based RAT (e.g., WCDMA, CDMA2000, GSM, LTE, LTE-A, NR, etc.) to establish a picocell or femtocell. As shown in FIG. 5A, the base station 114*c* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, messaging, authorization and authentication, applications, and/or Voice Over Internet Protocol (VOIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 5A, it may be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103*b*/104*b*/105*b* or a different RAT.

Some or all of the WTRUs 102*a*, 102*b*, 102*c*, 102*d*, 102*e*, and 102*f* in the communications system 100 may include multi-mode capabilities, e.g., the WTRUs 102*a*, 102*b*, 102*c*, 102*d*, 102*c*, and 102*f* may include multiple transceivers for communicating with different wireless networks over different wireless links. For example, the WTRU 102*g* shown in FIG. 5A may be configured to communicate with the base station 114*a*, which may employ a cellular-based radio technology, and with the base station 114*c*, which may employ an IEEE 802 radio technology.

Although not shown in FIG. 5A, it may be appreciated that a User Equipment may make a wired connection to a gateway. The gateway maybe a Residential Gateway (RG). The RG may provide connectivity to a Core Network 106/107/109. It may be appreciated that many of the ideas contained herein may equally apply to UEs that are WTRUs and UEs that use a wired connection to connect to a network. For example, the ideas that apply to the wireless interfaces 115, 116, 117 and 115*c*/116*c*/117*c* may equally apply to a wired connection.

Figure 5B:
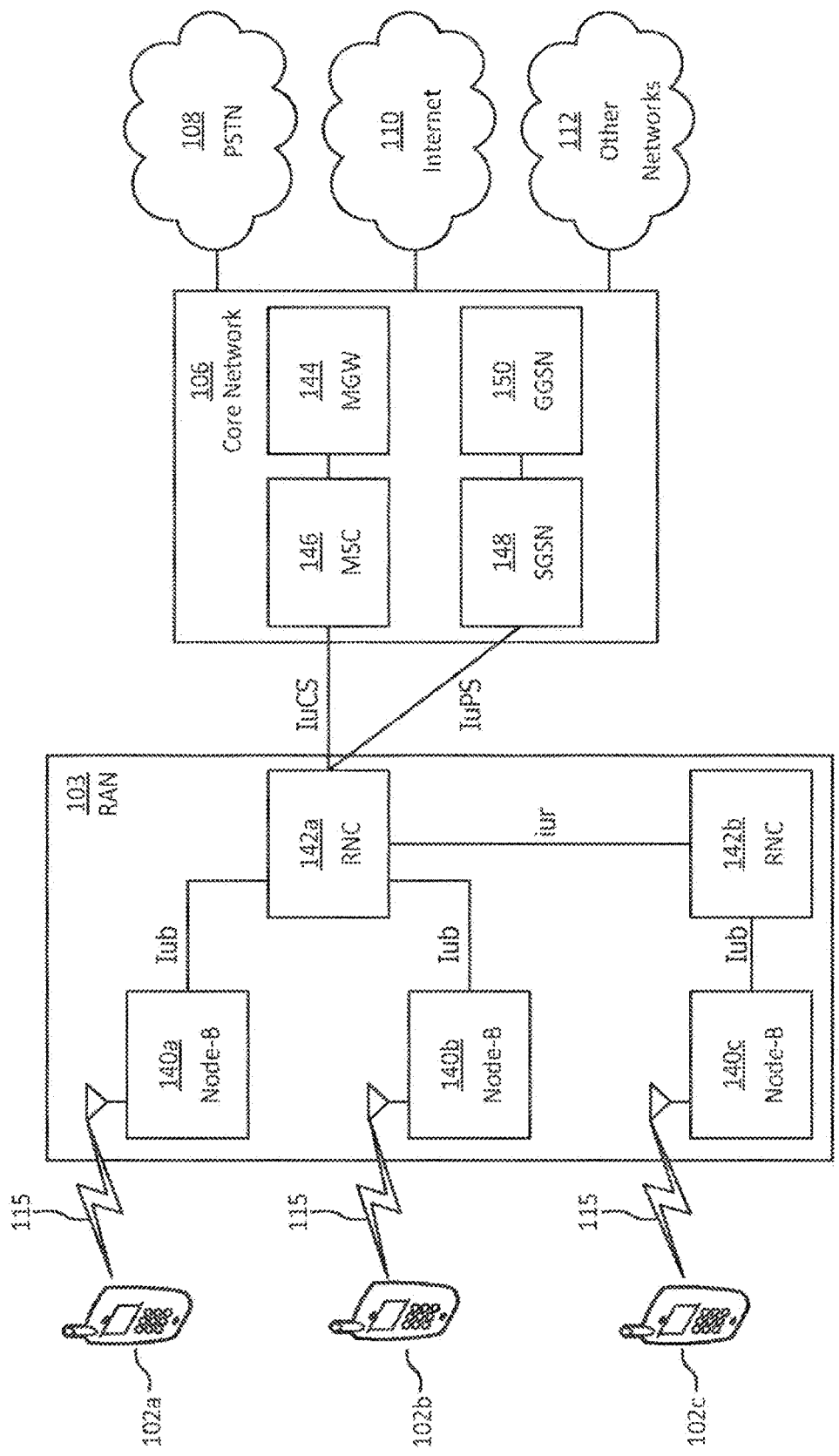
FIGS. 5B, 5C, and 5D are system diagrams of example RANs and core networks.

FIG. 5B may be a system diagram of an example RAN 103 and core network 106. As noted above, the RAN 103 may employ a UTRA radio technology to communicate with the WTRUs 102*a*, 102*b*, and 102*c* over the air interface 115. The RAN 103 may also be in communication with the core network 106. As shown in FIG. 5B, the RAN 103 may include Node-Bs 140*a*, 140*b*, and 140*c*, which may each include one or more transceivers for communicating with the WTRUs 102*a*, 102*b*, and 102*c* over the air interface 115. The Node-Bs 140*a*, 140*b*, and 140*c* may each be associated with a particular cell (not shown) within the RAN 103. The RAN 103 may also include RNCs 142a, 142b. It may be appreciated that the RAN 103 may include any number of Node-Bs and Radio Network Controllers (RNCs.)

As shown in FIG. 5B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it may be connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 5B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it may be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 5C:
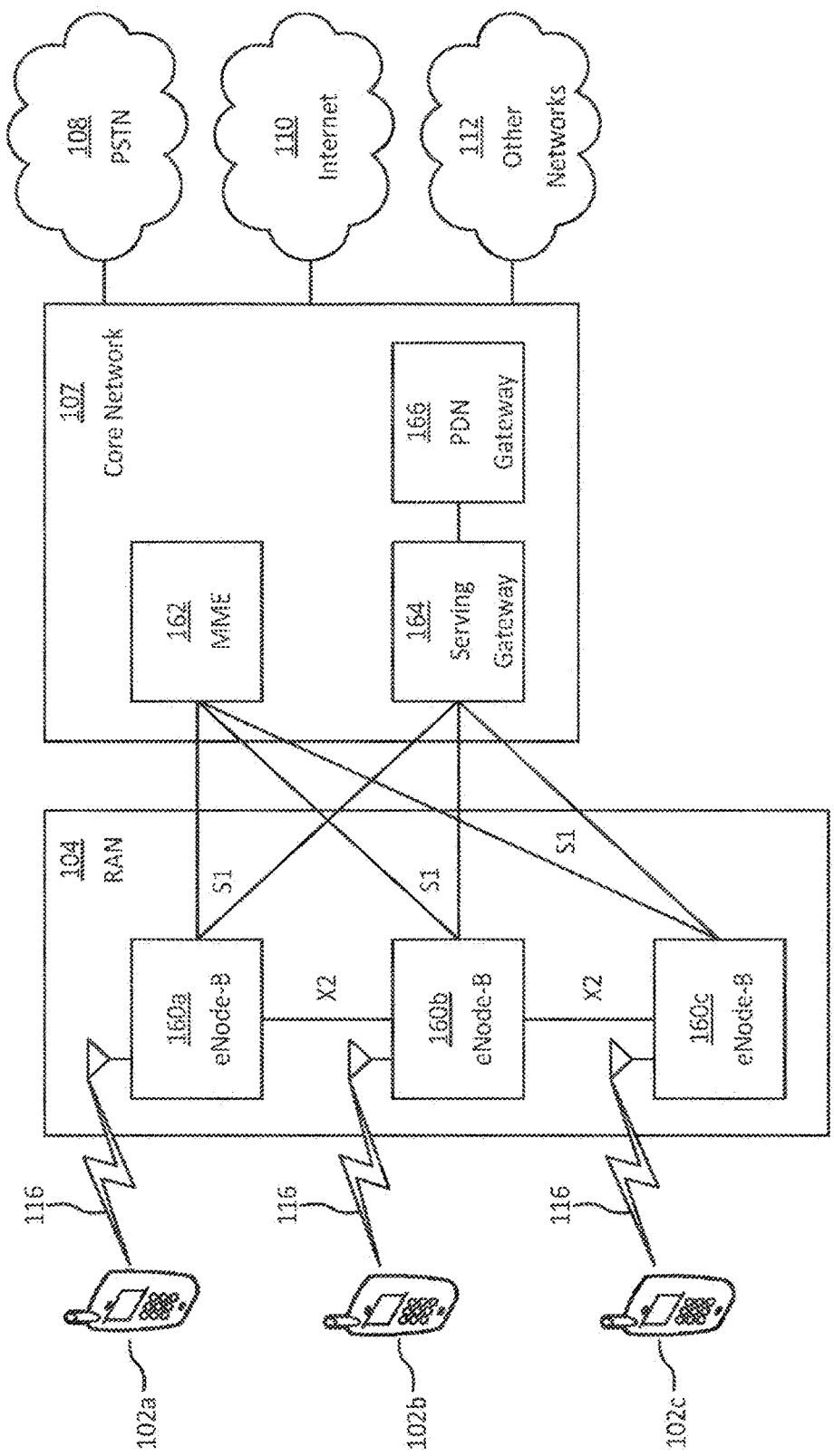

FIG. 5C may be a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it may be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 5C, the eNode-Bs 160a, 160b, and 160c may communicate with one another over an X2 interface.

The core network 107 shown in FIG. 5C may include a Mobility Management Gateway (MME) 162, a serving gateway 164, and a Packet Data Network (PDN) gateway 166. While each of the foregoing elements are depicted as part of the core network 107, it may be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data may be available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 5D:
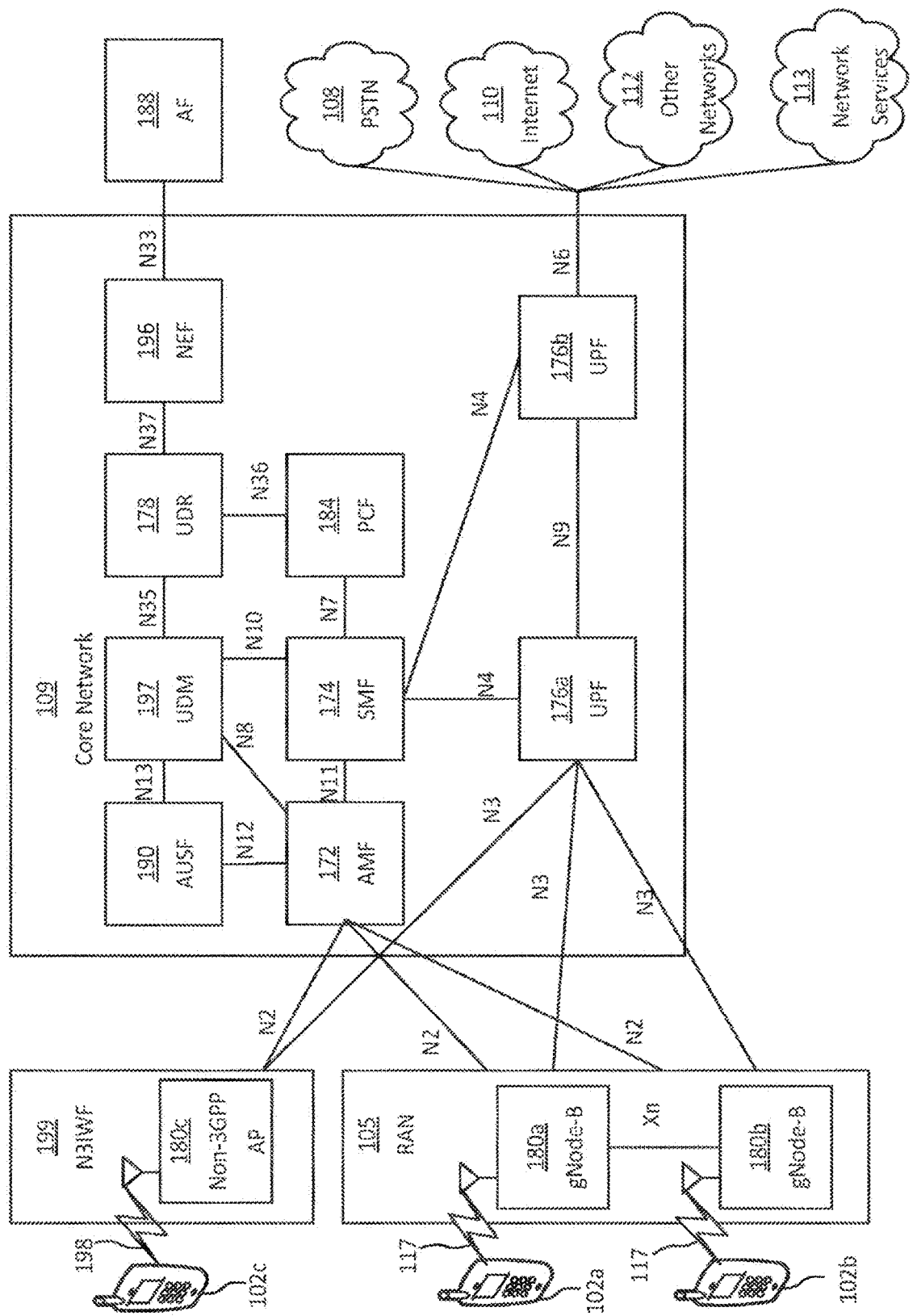

FIG. 5D may be a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It may be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It may also be appreciated the RAN 105 may employ more than one type of base station. For example, the RAN may employ eNode-Bs and gNode-Bs.

The N3IWF 199 may include a non-3GPP Access Point 180c. It may be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 5D, the gNode-Bs 180a and 180b may communicate with one another over an Xn interface, for example.

The core network 109 shown in FIG. 5D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It may be understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 5G.

In the example of FIG. 5D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it may be appreciated that any one of these elements may be owned and/or operated by an entity other than the core network operator. It may also be appreciated that a 5G core network may not consist of all of these elements, may consist of additional elements, and may consist of multiple instances of each of these elements. FIG. 5D shows that network functions directly connect to one another, however, it should be appreciated that they may communicate via routing agents such as a diameter routing agent or message buses.

In the example of FIG. 5D, connectivity between network functions may be achieved via a set of interfaces, or reference points. It may be appreciated that network functions may be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface may not be shown in FIG. 5D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 5D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function may add to, read from, and modify the data that may be in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing may be a mechanism that may be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g., in the areas of functionality, performance and isolation.

3GPP has designed the 5G core network to support Network Slicing. Network Slicing may be a good tool that network operators may use to support the diverse set of 5G use cases (e.g., massive IoT, critical communications, V2X, and enhanced mobile broadband) which demand very diverse and sometimes extreme requirements. Without the use of network slicing techniques, it may be likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 5D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 8A, 8C, 8D, and 8E are identified by the names given to those entities in certain existing 3GPP specifications, but it may be understood that in the future those entities and functionalities may be identified by other names and certain entities or functions may be combined in future specifications published by 3GPP, including future 3GPP NR specifications. Thus, the particular network entities and functionalities described and illustrated in FIGS. 8A, 8B, 8C, 8D, and 8E are provided by way of example only, and it may be understood that the subject matter disclosed and claimed herein may be embodied or implemented in any similar communication system, whether presently defined or defined in the future.

Figure 5E:
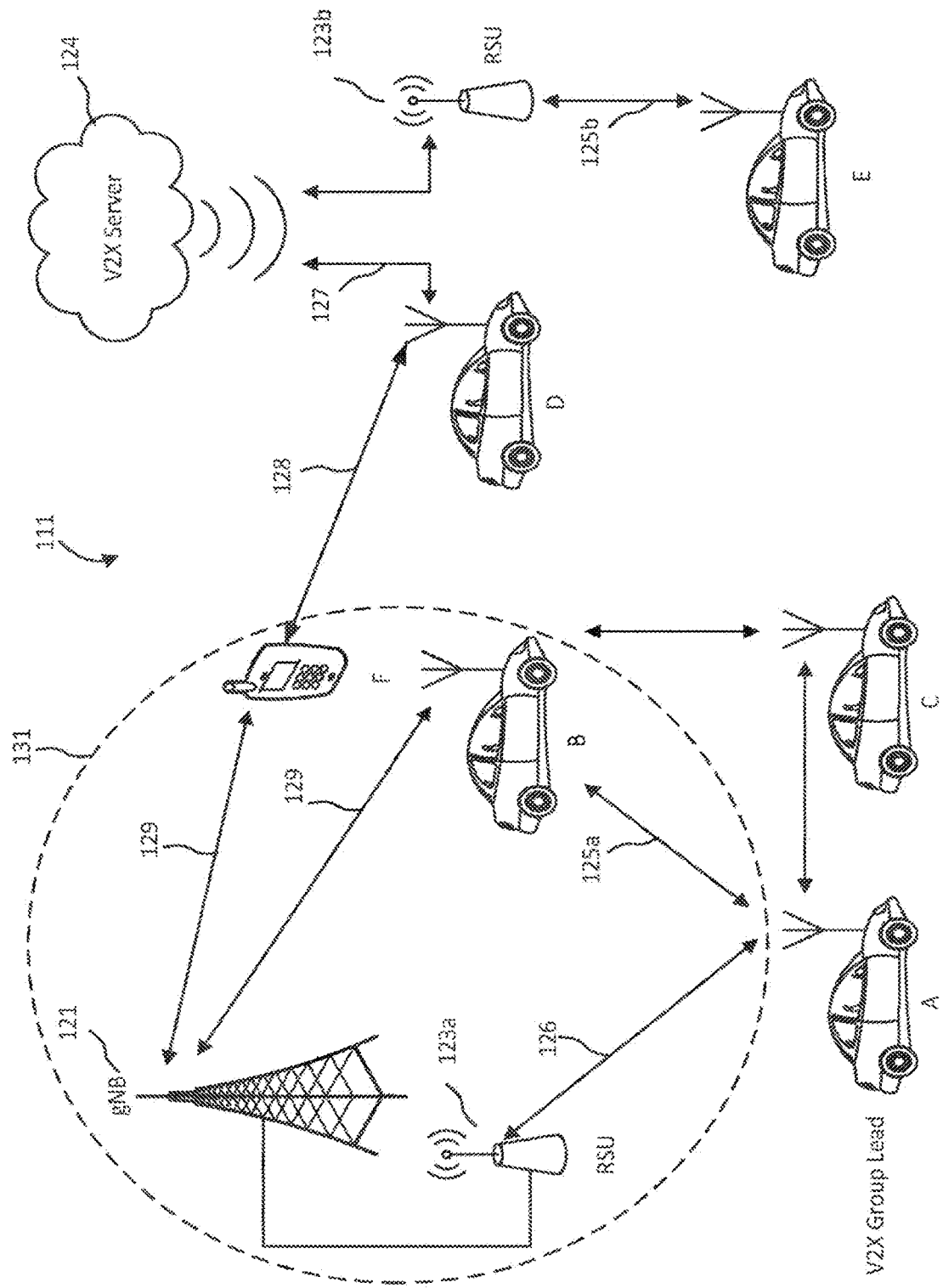
FIG. 5E illustrates another example communications system.

FIG. 5E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A may be the group lead and WTRUs B and C are group members.

WTRUS A, B, C, D, E, and F may communicate with each other over a Uu interface 129 via the gNB 121 if they are within the access network coverage 131. In the example of FIG. 5E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 5E, WRTU D, which may be outside of the access network coverage 131, communicates with WTRU F, which may be inside the coverage 131.

WTRUS A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 5F:
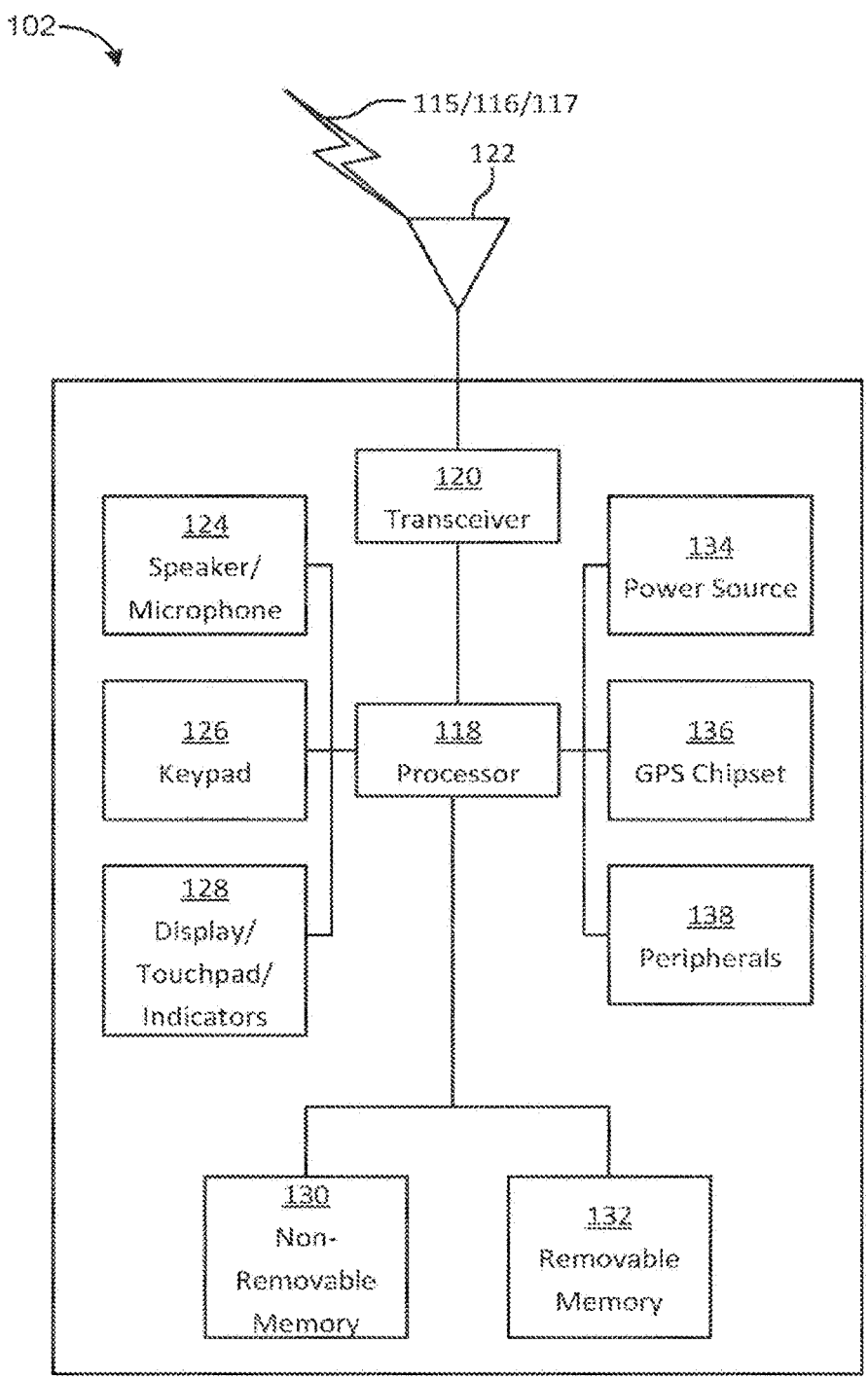
FIG. 5F is a block diagram of an example apparatus or device, such as a WTRU.

FIG. 5F may be a block diagram of an example apparatus or device WTRU 102 that may be configured for wireless communications and operations in accordance with the systems, methods, and apparatuses described herein, such as a WTRU 102 of FIG. 5A, 8B, 8C, 8D, or 8E. As shown in FIG. 5F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It may be appreciated that the WTRU 102 may include any subcombination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 5F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 5F depicts the processor 118 and the transceiver 120 as separate components, it may be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 5A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It may be appreciated that the transmit/receive element 122 may be configured to transmit and/or receive any combination of wireless or wired signals.

In addition, although the transmit/receive element 122 may be depicted in FIG. 5F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that may not be physically located on the WTRU 102, such as on a server that may be hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It may be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 5G:
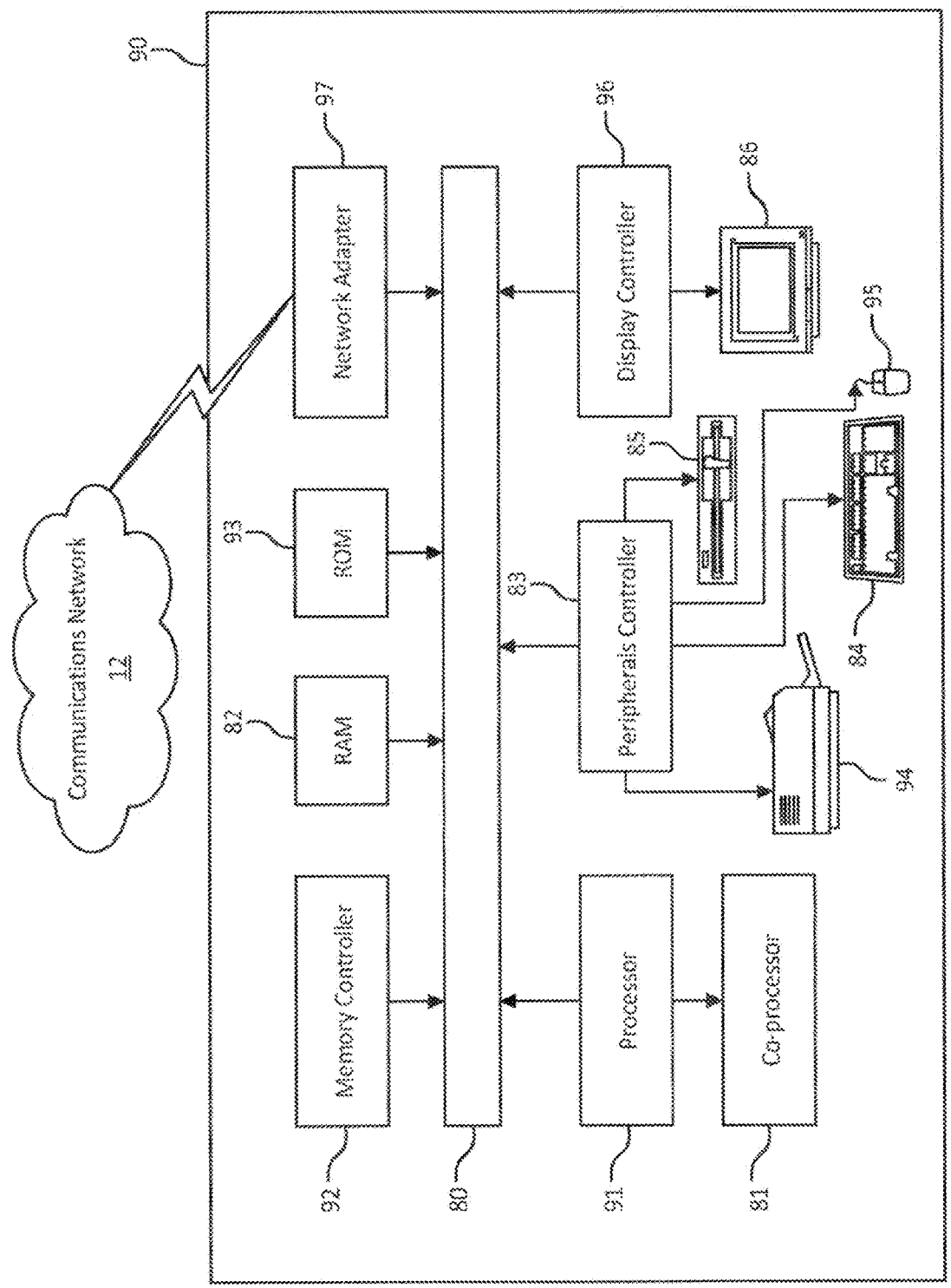
FIG. 5G is a block diagram of an exemplary computing system.

FIG. 5G may be a block diagram of an exemplary computing system 90 in which one or more apparatuses of the communications networks illustrated in FIGS. 8A, 8C, 8D and 8E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software may be stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 may be an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 may be the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that may not easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it may not access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which may be controlled by display controller 96, may be used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that may be sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 8A, 8B, 8C, 8D, and 8E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It may be understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

What may be claimed is:

1. A wireless transmit/receive unit (WTRU), comprising a transceiver and one or more processors, configured to:
    receive a first radio resource control (RRC) reconfiguration message, the first RRC reconfiguration message comprising a value for a timer associated with sending assistance information related to secondary cell group (SCG) deactivation, the first RRC reconfiguration message indicating one or more conditions to activate a SCG;
    determine that the one or more conditions to activate the SCG are satisfied;
    activate the SCG based on the determination that the one or more conditions are satisfied;
    determine a first preference associated with SCG deactivation;
    on a condition that the determined first preference is a preference for SCG deactivation and that the timer is not running, transmit a first assistance information message, the first assistance information message comprising the first preference associated with SCG deactivation;
    start the timer based on the transmission of the first assistance information message comprising the first preference associated with SCG deactivation, wherein the timer is configured based on the value;
    receive a second RRC reconfiguration message, the second RRC reconfiguration message indicating that the SCG is deactivated;
    determine a second preference associated with SCG deactivation; and
    transmit a second assistance information message, the second assistance information message comprising the second preference associated with SCG deactivation and the second assistance information message being transmitted when the timer is not running.

2. The WTRU of claim 1, wherein the one or more conditions to activate the SCG are based on one or more radio measurement configurations that the WTRU is configured to use when the SCG is deactivated.

3. The WTRU of claim 2, wherein the one or more radio measurement configurations correspond to a reduced measurement of associated radio resource management parameters.

4. The WTRU of claim 1, wherein the transceiver and the one or more processors are further configured to:
  determine an evaluation measure comprising a significance of a dynamic change of data rate or one or more quality of service attributes; and
  transmit the evaluation measure, wherein the behavior of the WTRU upon the activation of the SCG is based on the evaluation measure.

5. The WTRU of claim 4, wherein the transceiver and the one or more processors are further configured to:
  determine a threshold value for the evaluation measure, wherein the significance of the dynamic change is based on a comparison of the evaluation measure with the determined threshold.

6. The WTRU of claim 1, wherein the second RRC configuration message further indicates a behavior of the WTRU after the activation of the SCG.

7. The WTRU of claim 6, wherein the behavior of the WTRU after the activation of the SCG is based on a collective data rate requirement of running one or more applications in an operating system of the WTRU.

8. The WTRU of claim 7, wherein the collective data rate requirement is based at least in part on a dynamic change of one or more of a data rate, a latency, or one or more attributes of quality of service attributes.

9. The WTRU of claim 1, wherein the transceiver and the one or more processors are further configured to:
  receive, from a source cell, an indication to perform a conditional primary and secondary cell addition and change (CPAC) handover procedure and conditional execution criteria, wherein the CPAC handover procedure directs the WTRU to handover to one or more target cells;
  receive, via a third RRC configuration message from a network, an indication of one or more execution conditions, wherein each of the one or more execution conditions comprises requirements for performing handover to each of the one or more target cells;
  transmit, to the network, in response to the third RRC configuration message, a message confirming reception of the third RRC configuration message;
  determine which of the one or more target cells will receive the handover based on the execution conditions; and
  perform the CPAC handover procedure to the determined one or more target cells based on whether the conditional execution criteria are met.

10. A method implemented by a wireless transmit/receive unit (WTRU), the method comprising:
  receiving a first radio resource control (RRC) reconfiguration message, the first RRC reconfiguration message comprising a value for a timer associated with sending assistance information related to secondary cell group (SCG) deactivation, the first RRC reconfiguration message indicating one or more conditions to activate a SCG;
  determining that the one or more conditions to activate the SCG are satisfied;
  activating the SCG based on the determination that the one or more conditions are satisfied;
  determining a first preference associated with SCG deactivation;
  on a condition that the determined first preference is a preference for SCG deactivation and that the timer is not running, transmitting a first assistance information message, the first assistance information message comprising the first preference associated with SCG deactivation;
  starting the timer based on the transmission of the first assistance information message comprising the first preference associated with SCG deactivation, wherein the timer is configured based on the value;
  receiving a second RRC reconfiguration message, the second RRC reconfiguration message indicating that the SCG is deactivated;
  determining a second preference associated with SCG deactivation; and
  transmitting a second assistance information message, the second assistance information message comprising the second preference associated with SCG deactivation and the second assistance information message being transmitted when the timer is not running.

11. The method of claim 10, wherein the one or more conditions to activate the SCG are based on one or more radio measurement configurations that the WTRU uses when the SCG is deactivated.

12. The method of claim 11, wherein the one or more radio measurement configurations correspond to a reduced measurement of associated radio resource management parameters.

13. The method of claim 10, further comprising:
  determining an evaluation measure comprising a significance of a dynamic change of data rate or one or more quality of service attributes; and
  transmitting the evaluation measure, wherein the behavior of the WTRU upon the activation of the SCG is based on the evaluation measure.

14. The method of claim 13, further comprising:
  determining a threshold value for the evaluation measure, wherein the significance of the dynamic change is based on a comparison of the evaluation measure with the determined threshold.

15. The method of claim 10, wherein the second RRC configuration message further indicates a behavior of the WTRU after the activation of the SCG.

16. The method of claim 15, wherein the behavior of the WTRU after the activation of the SCG is based on a collective data rate requirement of running one or more applications in an operating system of the WTRU.

17. The method of claim 16, wherein the collective data rate requirement is based at least in part on a dynamic change of one or more of a data rate, a latency, or one or more attributes of quality of service attributes.

18. The method of claim 10, further comprising:
  receiving, from a source cell, an indication to perform a conditional primary and secondary cell addition and change (CPAC) handover procedure and conditional execution criteria, wherein the CPAC handover procedure directs the WTRU to handover to one or more target cells;
  receiving, via a third RRC configuration message from a network, an indication of one or more execution conditions, wherein each of the one or more execution conditions comprises requirements for performing handover to each of the one or more target cells;

transmitting, to the network, in response to the third RRC configuration message, a message confirming reception of the third RRC configuration message;

determining which of the one or more target cells will receive the handover based on the execution conditions; and performing the CPAC handover procedure to the determined one or more target cells based on whether the conditional execution criteria are met.

19. The WTRU of claim 4, wherein the transceiver and the one or more processors are further configured to:

transmit the evaluation measure as part of the assistance information upon receiving a request from a network node.

20. The method of claim 13, the method further comprising:

transmitting the evaluation measure as part of the assistance information upon receiving a request from a network node.

* * * * *